(12) United States Patent
Kawai et al.

(10) Patent No.: US 6,879,769 B1
(45) Date of Patent: Apr. 12, 2005

(54) DEVICE FOR PROCESSING RECORDED INFORMATION AND STORAGE MEDIUM STORING PROGRAM FOR SAME

(75) Inventors: Sunao Kawai, Toyoake (JP); Kenji Miyata, Nagoya (JP); Ryuji Yamada, Ogaki (JP); Hideaki Teshima, Tokoname (JP); Kazuma Aoki, Kasugai (JP); Norihisa Fujii, Tokoname (JP); Yoshihiko Horibe, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1073 days.

(21) Appl. No.: 09/698,248

(22) Filed: Oct. 30, 2000

(30) Foreign Application Priority Data

Oct. 28, 1999 (JP) .......................................... 11-307743

(51) Int. Cl.[7] .............................. H04N 5/93; H04N 5/91
(52) U.S. Cl. .............................. 386/52; 386/55; 386/81
(58) Field of Search .............................. 386/46, 52, 55, 386/53, 68, 69, 81, 109, 111, 112, 27, 33, 1, 4, 6, 38, 40, 107, 117, 124; H04N 5/93, 5/91

(56) References Cited

U.S. PATENT DOCUMENTS 5,122,886 A * 6/1992 Tanaka ....................... 386/104
5,621,536 A * 4/1997 Kizu ............................ 386/52
5,675,696 A * 10/1997 Ishimoto et al. ............ 386/112

FOREIGN PATENT DOCUMENTS

| JP | A 5-266092 | 10/1993 |
|---|---|---|
| JP | A 8-163507 | 6/1996 |
| JP | A 9-322111 | 12/1997 |
| JP | A 10-51733 | 2/1998 |
| JP | A 10-254746 | 9/1998 |
| JP | A 10-327360 | 12/1998 |
| JP | A-10-327380 | 12/1998 |

* cited by examiner

Primary Examiner—Robert Chevailer
(74) Attorney, Agent, or Firm—Oliff & Berridge, PLC

(57) ABSTRACT

An information preparation device, such as a personal computer, detects non-consecutive position information, such as times and dates, based on parameters (S11), such as preinputted non-consecutive point detection margins, and prepares (S12) an information table with image information for each non-consecutive position. Based on editing parameters, the device synthesizes and edits (S13) the information in the information table by date and the like. Then the device divides the information into objects, which is a data format, by data The device retrieves contents information and the like that corresponds to the divided information, and generates (S14) and outputs (S15) scenario information. The date and the like indicated by the divided regions serve as an index on buttons of menus that the user operates to easily select and display a desired images.

28 Claims, 32 Drawing Sheets

| IMAGE ELEMENT | CUT POINT INFORMATION |
|---|---|
| A | 1999/6/15 13:00:00-14:00:00 |
| B | 1999/6/15 14:30:00-15:00:00 |
| C | 1999/6/15 15:30:00-16:00:00 |
| D | 1999/6/15 16:30:00-17:00:00 |
| E | 1999/6/15 17:01:00-17:30:00 |
| F | 1999/6/15 17:40:00-18:00:00 |
| G | 1999/6/16 14:30:00-15:00:00 |
| H | 1999/6/16 14:30:00-15:00:00 |
| I | 1999/6/16 15:30:00-16:00:00 |
| J | 1999/6/16 16:02:00-16:30:00 |
| K | 1999/6/20 16:30:00-17:00:00 |

FIG. 6 (A)

| DV RECORDING INFORMATION | | | | | | | | | |
|---|---|---|---|---|---|---|---|---|---|
| DATE RECORDED | | | TIME RECORDED | | | TimeCode | | | |
| YEAR | MONTH | DAY | HOUR | MINUTE | SECOND | HOUR | MINUTE | SECOND | Frame |

FIG. 6 (B)

| CUT POINT INFORMATION | | |
|---|---|---|
| DATA NUMBER | IN POINT INFORMATION | OUT POINT INFORMATION |
| | DV RECORDING INFORMATION | DV RECORDING INFORMATION |

FIG. 6 (C)

| CUT POINT INFORMATION TABLE | | | |
|---|---|---|---|
| CUT POINT INFORMATION (1) | CUT POINT INFORMATION (2) | | CUT POINT INFORMATION (n) |

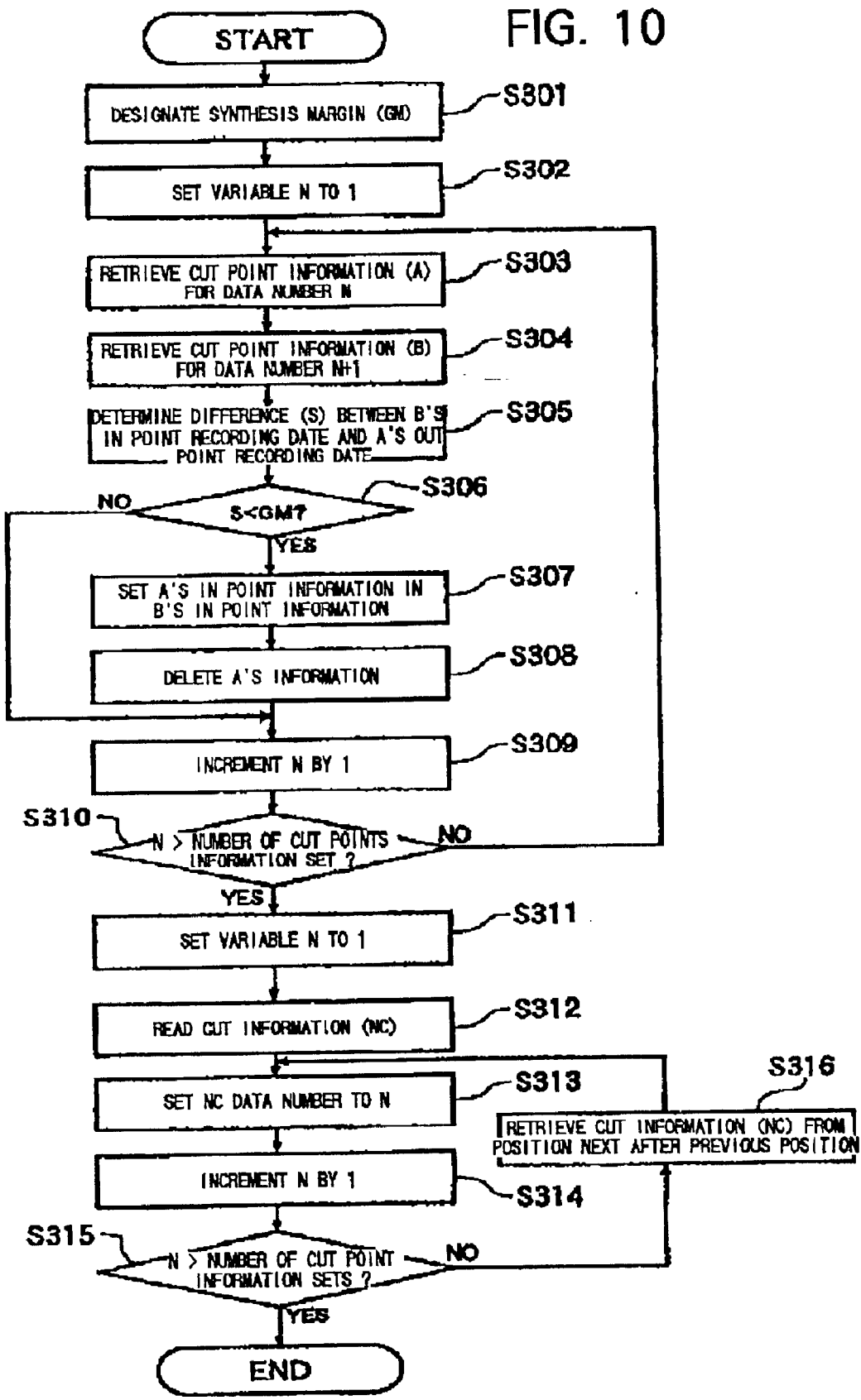

FIG. 11

CUT POINT INFORMATION (AFTER BEING GROUPED BY DATE)

| No | CUT POINT INFORMATION | MENU NO. |
|---|---|---|
| 1 | 1999/6/15 13:00:00–14:00:00 | 1 |
| 2 | 1999/6/15 14:30:00–15:00:00 | 1 |
| 3 | 1999/6/15 15:30:00–16:00:00 | 1 |
| 4 | 1999/6/15 16:30:00–17:00:00 | 1 |
| 5 | 1999/6/15 17:01:00–17:30:00 | 1 |
| 6 | 1999/6/15 17:40:00–18:00:00 | 1 |

| No | CUT POINT INFORMATION | MENU NO. |
|---|---|---|
| 7 | 1999/6/16 13:00:00–14:00:00 | 2 |
| 8 | 1999/6/16 14:30:00–15:00:00 | 2 |
| 9 | 1999/6/16 15:30:00–16:00:00 | 2 |
| 10 | 1999/6/16 16:02:00–16:30:00 | 2 |

| No | CUT POINT INFORMATION | MENU NO. |
|---|---|---|
| 11 | 1999/6/20 16:30:00–17:00:00 | 3 |

↑ MENU PREPARATION

PREPARATION CONDITIONS
NUMBER OF BUTTONS IN A SINGLE MENU ARE FOUR OR LESS

⇒ ACCORDING TO THESE CONDITIONS, MENU NO.1 IS DIVIDED INTO TWO MENUS 1-x

CUT POINT INFORMATION (AFTER BEING GROUPED BY DATE)

| No | CUT POINT INFORMATION | MENU NO. |
|---|---|---|
| 1 | 1999/6/15 13:00:00–14:00:00 | 1-1 |
| 2 | 1999/6/15 14:30:00–15:00:00 | 1-1 |
| 3 | 1999/6/15 15:30:00–16:00:00 | 1-1 |
| 4 | 1999/6/15 16:30:00–17:00:00 | 1-1 |

| No | CUT POINT INFORMATION | MENU NO. |
|---|---|---|
| 5 | 1999/6/15 17:01:00–17:30:00 | 1-2 |
| 6 | 1999/6/15 17:40:00–18:00:00 | 1-2 |

| No | CUT POINT INFORMATION | MENU NO. |
|---|---|---|
| 7 | 1999/6/16 13:00:00–14:00:00 | 2 |
| 8 | 1999/6/16 14:30:00–15:00:00 | 2 |
| 9 | 1999/6/16 15:30:00–16:00:00 | 2 |
| 10 | 1999/6/16 16:02:00–16:30:00 | 2 |

| No | CUT POINT INFORMATION | MENU NO. |
|---|---|---|
| 11 | 1999/6/20 16:30:00–17:00:00 | 3 |

FIG. 22

| SCENARIO INFORMATION | | | |
|---|---|---|---|
| NODE INFORMATION (1) | NODE INFORMATION (2) | ~ | NODE INFORMATION (n) |

FIG. 23 (A)

| NODE INFORMATION (MENU DISPLAY TYPE) | | | | |
|---|---|---|---|---|
| NUMBER | PARENT NODE NUMBER | NODE NAME | MENU INFORMATION | CONDITION TRANSITIONAL INFORMATION |

FIG. 23 (B)

| NODE INFORMATION (CONTENTS DISPLAY TYPE) | | | | |
|---|---|---|---|---|
| NUMBER | PARENT NODE NUMBER | NODE NAME | CONTENTS SET INFORMATION | CONDITION TRANSITIONAL INFORMATION |

FIG. 24

| MENU INFORMATION | |
|---|---|
| MENU BACKGROUND IMAGE FILE NAME | MENU TEXT SETTINGS |

DEVICE FOR PROCESSING RECORDED INFORMATION AND STORAGE MEDIUM STORING PROGRAM FOR SAME

BACKGROUND OF THE INVENTION

1. Field of the Invention

The present invention relates to a device for processing recorded information, such as text information, image information, and sound information, and to a storage medium that stores a program for processing such recorded information, in a format retrievable by a computer.

2. Description of the Related Art

Video cameras often record images with the date and time that a particular scene was recorded. There is a growing need for a method that enables a user to store images grouped by time and date into a random access memory, such as a write-once read-many DVD-R, and that enables the user to freely search through images and play back desired images using simple operations.

To meet this need, Japanese Laid-Open Patent Publication Hei-10-327380 discloses an image management device for preparing scenario information, which corresponds to menus of recorded images.

However, in this conventional method for preparing scenario information, scenario information with complex transitional data structure such as used in DVDs can not be prepared. Therefore, users can not easily select desired images. When scenario information is prepared according to the time when the images were recorded and menus displayed accordingly, then menus for a great many images will be displayed on a single screen. The menus are difficult to discriminate, thereby making it difficult for users to select a desired menu.

SUMMARY OF THE INVENTION

It is an object of the present invention to provide a device, or a storage medium that stores a program in a format retrievable by a computer, for automatically processing recorded information, such as text information, image information, and sound information recorded on a memory medium such as a video tape, based on identification information also recorded on the memory medium, and perform display operations that enable a user to easily select desired recorded information.

To achieve the above and other objects, there is provided, accordingly to one aspect of the invention, a recorded information processing device that includes a non-consecutive position information detecting unit, a recorded information dividing unit, and a display unit. The non-consecutive position information detecting unit detects non-consecutive position information representative of each of a plurality of blocks of recorded information recorded in time sequence in a recording medium, such as a video tape. Identification information, such as day and time data, is attached to each of the plurality of blocks of recorded information. The recorded information dividing unit divides, based on the non-consecutive position information, the plurality of blocks of recorded information into a plurality of groups. A number of the plurality of groups is determined so as not to exceed a predetermined maximum. Also, a number of blocks of recorded information contained in each of the plurality of groups does not exceed the predetermined maximum. The display unit displays first indicias corresponding respectively to the plurality of groups on a display screen. Each of the first indicias is in association with the identification information of one or more blocks of recorded information contained in a corresponding group.

With this configuration, the user can easily select desired recorded information by merely viewing the first indicias.

The display unit further displays second indicias corresponding to the one or more blocks of recorded information contained in the corresponding group. Each of the second indicias is in association with the identification information of the one or more blocks of recorded information contained in the corresponding group.

The first indicias form a first level menu and the second indicias form a second level menu. The first level menu and the second level menu are in a hierarchy data structure in which the second level menu is linked with a corresponding one of the first indicias. The first indicias displayed on the display screen serve as buttons for displaying the plurality of groups. Also, the second indicias displayed on the display screen serve as buttons for reproducing the blocks of recorded information contained in a group indicated by a corresponding first indicia. The predetermined maximum is determined based on a size of the buttons and a size of the display screen.

A number setting unit is further provided that sets the number that the recorded information dividing unit divides the plurality of blocks of recorded information.

It is preferable that information extracted from the non-consecutive position information be used as the identification information of a corresponding block of recorded information.

It is also preferable that the identification information of the one or more blocks of recorded information contained in each of the groups be made up of common information and unique information. In such a case, the common information is used as the first indicia.

In the case of video tapes, for example, the identification information is represented by time at which corresponding block of recorded information is recorded. According to another aspect of the invention, there is provided a scenario information generating device that includes an input unit, a cut point information preparation unit, an editing unit, and a generating unit. The input unit is provided for allowing a user to input scenario preparation conditions. The scenario preparation conditions include cut point information preparation parameters and cut point information table editing parameters. The cut point information preparation unit is provided for preparing a cut point information table containing a plurality of pieces of cut point information. Each of the plurality of pieces of cut point information represents a length of a block of recorded information. The length is defined by a start time point and an end time point of the block of recorded information. The plurality of pieces of cut point information are detected from a plurality of blocks of recorded information in accordance with the cut point information preparation parameters. The plurality of blocks of recorded information are recorded in time sequence on a recording medium. The editing unit is provided for editing the cut point information table so that the plurality of blocks of recorded information are divided into a plurality of groups based on the plurality of pieces of cut point information. A number of the plurality of groups is determined so as not to exceed a predetermined maximum. Also, a number of blocks of recorded information contained in each of the plurality of groups does not exceed the predetermined maximum. The editing unit outputs cut point information table editing data. The generating unit is provided for generating scenario information of the plurality of recorded information based on the cut point information table editing data.

A display unit is further provided for displaying, based on the scenario information, a first menu page containing first indicias corresponding to the plurality of groups and a second menu page containing second indicias corresponding to one or more blocks of recorded information contained in a corresponding group. The plurality of blocks of recorded information are retrieved from a video tape.

It is preferable that the cut point information be represented by time data.

The editing unit may synthesize at least two pieces of cut point information adjacent in time to each other to provide a new piece of cut point information in accordance with the cut point information table editing parameters to provide a modified cut point information table. In this case, the editing unit edits the modified cut point information table instead of the cut point information table.

According to another aspect of the invention, there is provided a storage medium storing a recorded information processing program, and also a storage medium storing a scenario information generating program. When a computer is run with such a storage medium, the devices as described above can be implanted.

BRIEF DESCRIPTION OF THE DRAWINGS

The above and other objects, features and advantages of the invention will become more apparent from reading the following description of the embodiment taken in connection with the accompanying drawings in which:

FIG. 6(A) is a schematic view showing data configuration of DV recording information used to generate scenario information;

FIG. 6(B) is a schematic view showing data configuration of cut point information used to generate scenario information;

FIG. 6(C) is a schematic view showing data configuration of a cut point information table recorded as a group of cut point information sets;

FIG. 10 is a flowchart representing processes for synthesizing cut point information;

FIG. 11 is a schematic view showing a list of cut point information grouped by data and time intervals;

FIG. 22 is a schematic view showing format of a scenario information file;

FIG. 23(A) is a schematic view showing format of menu display type node information;

FIG. 23(B) is a schematic view showing format of contents display type node information;

FIG. 24 is a schematic view showing format of menu information,

DETAILED DESCRIPTION OF THE PREFERRED EMBODIMENTS

Figure 1:
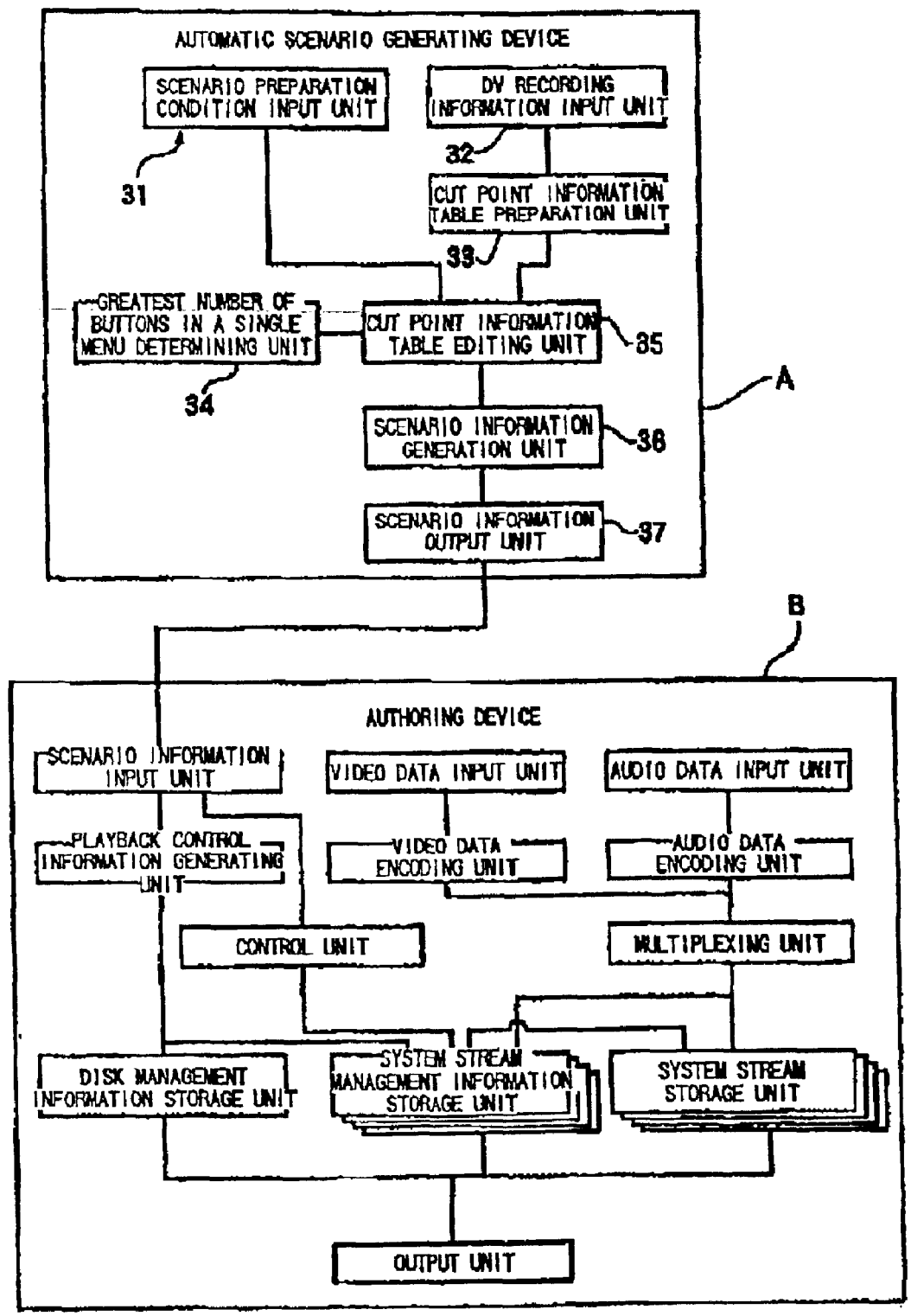
FIG. 1 is a block diagram showing a recorded information processing device including an automatic scenario generating device and an authoring device according to an embodiment of the present invention.

FIG. 1 is a block diagram showing configuration of a recorded information processing device that includes an automatic scenario generating device A and an authoring device B.

According to the present embodiment, the automatic scenario generating device A includes a scenario preparation condition input unit 31, a DV information input unit 32, a cut point information table preparation unit 33, a greatest-number-of-buttons-in-a-single-menu determining unit 34, a cut point information table editing unit 35, a scenario information generation unit 36, and a scenario information output unit 37. The scenario preparation condition input unit 31 is for inputting scenario preparation data, to be described later with reference to FIG. 4, which is required for preparing scenario information. The DV information input unit 32 is for receiving DV recording information from a DV deck 5 to be described later with reference to FIG. 2.

The cut point information table preparation unit 33 is for preparing a cut point information table (described later) for detecting a cut point as non-consecutive position information from DV recording information received by the cut point information table preparation unit 33.

The greatest-number-of-buttons-in-a-single-menu determining unit 34 serves as an information number setting unit, that uses scenario preparation condition data retrieved by the scenario preparation condition input unit 31 to determine the greatest number of buttons that can fit in a single menu screen (to be described later).

The cut point information table editing unit 35 retrieves the cut point information table and uses the scenario preparation condition table retrieved by the scenario preparation condition input unit 31 to edit the cut point information table by synthesizing, grouping together, and producing hierarchy from the cut point information, and outputting the result as a cut point information table editing data.

The scenario information generation unit 36 generates and outputs scenario information based on the cut point information table editing data from the cut point information table editing unit 35. The scenario information output unit 37 outputs the scenario information format that can be used by the authoring device B.

Scenario information is information for determining the configuration of the contents to be recorded on a DVD. Scenario information allows preparation of a DVD having the menu configuration shown in FIG. 15 (to be described later). The scenario information further enables the user to instantaneously retrieve desired contents from the DVD onto the screen so the user can view the desired contents.

Figure 2:
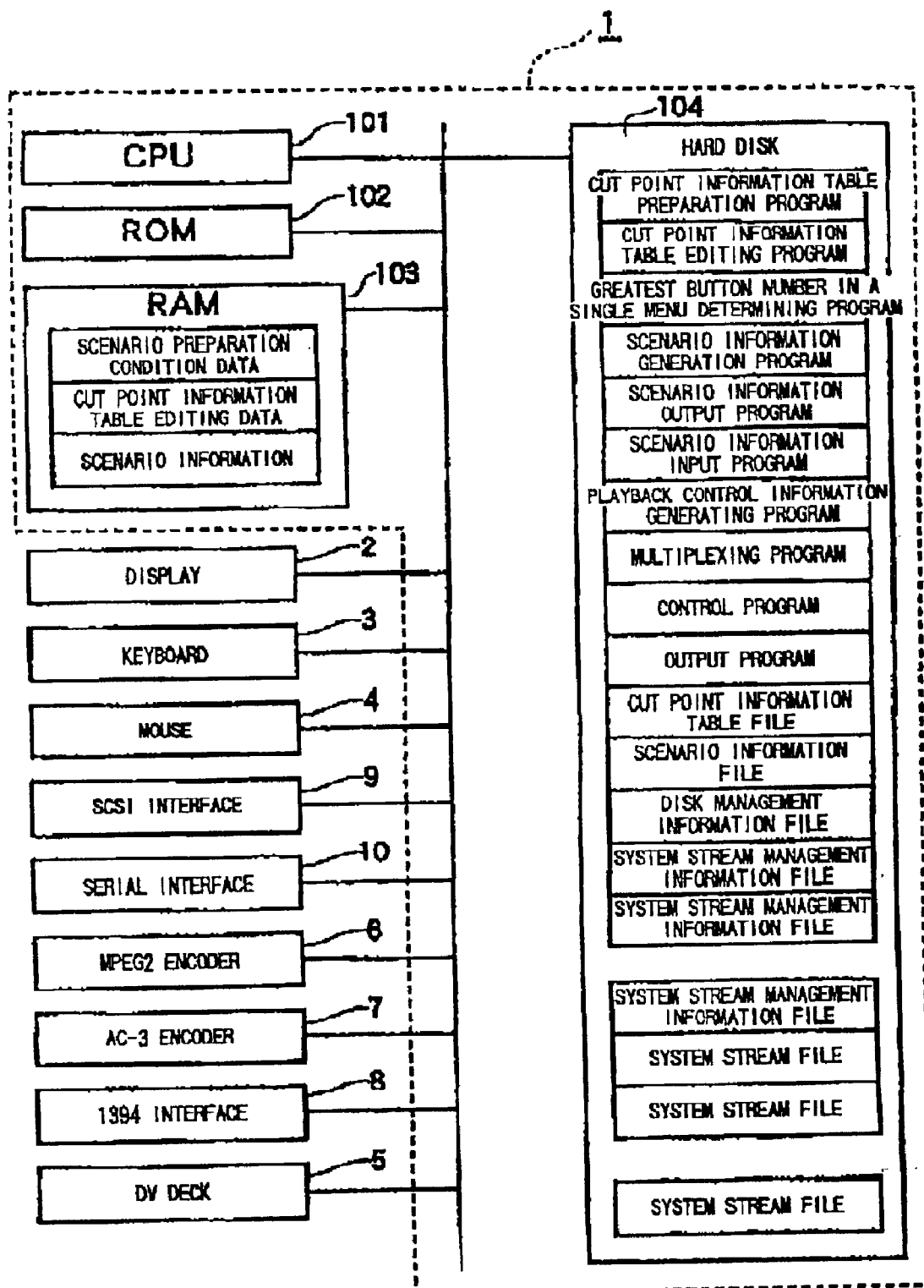
FIG. 2 is a block diagram showing overall configuration of the information preparation device including various programs executed by the automatic scenario generating device and the authoring device.

FIG. 2 is a block diagram showing overall configuration of the information preparation device including various programs executed by the automatic scenario generating device A and the authoring device B. The information preparation device includes an information preparation device main body 1 such as a personal computer, for example, a display 2 such as a CRT, a key board 3 and a mouse 4 which serve as input means, a DV deck 5 which serves as information playback unit for playing back video tapes, and an encoder 6, 7. The encoder 6, 7 includes an MPEG encoder 6 for performing encoding of image information played by the DV deck 5 and an AC-C encoder 7 for performing encoding of voice information. The DV deck 5 is connected to the information preparation device main body 1 by an IEEE1394 interface 8. Although not shown in the drawings, an optical disk reading device is connected to the information preparation device main body 1 by a SCSI interface 9.

The cut point information table preparation unit 33, the greatest-number-of-buttons-in-a-single-menu determining unit 34, the cut point information table editing unit 35, the scenario information generation unit 36, and the scenario information output unit 37 of the automatic scenario generating device according to the present invention are realized by a personal computer and software.

The scenario preparation condition input unit 31 is realized by using the key board 3 or the mouse 4 to input various conditions displayed on the display 2 in the form according to a cut point information table preparation program. The cut point information table outputted by the cut point information table preparation unit 33 and the scenario information outputted by the scenario information output unit 37 are realized as files stored in a hard disk 104 of the personal computer. The scenario preparation condition data acquired by the scenario preparation condition input unit 31, the cut point information table editing data output from the cut point information table editing unit 35, and the scenario information output from the scenario information generation unit 36 are realized as data stored in a RAM 103 of the personal computer.

The DV information input unit 32 is realized by a cut point information table generating program and the IEEE1394 interface 8, which is controlled by the cut point information table generating program. The DV information input unit 32 is connected to the DV deck 5. The DV information input unit 32 indicates that the DV recording information should be acquired from the DV deck 5 and indicates that video tape which serves as a memory medium should be played back or stopped.

Figure 3:
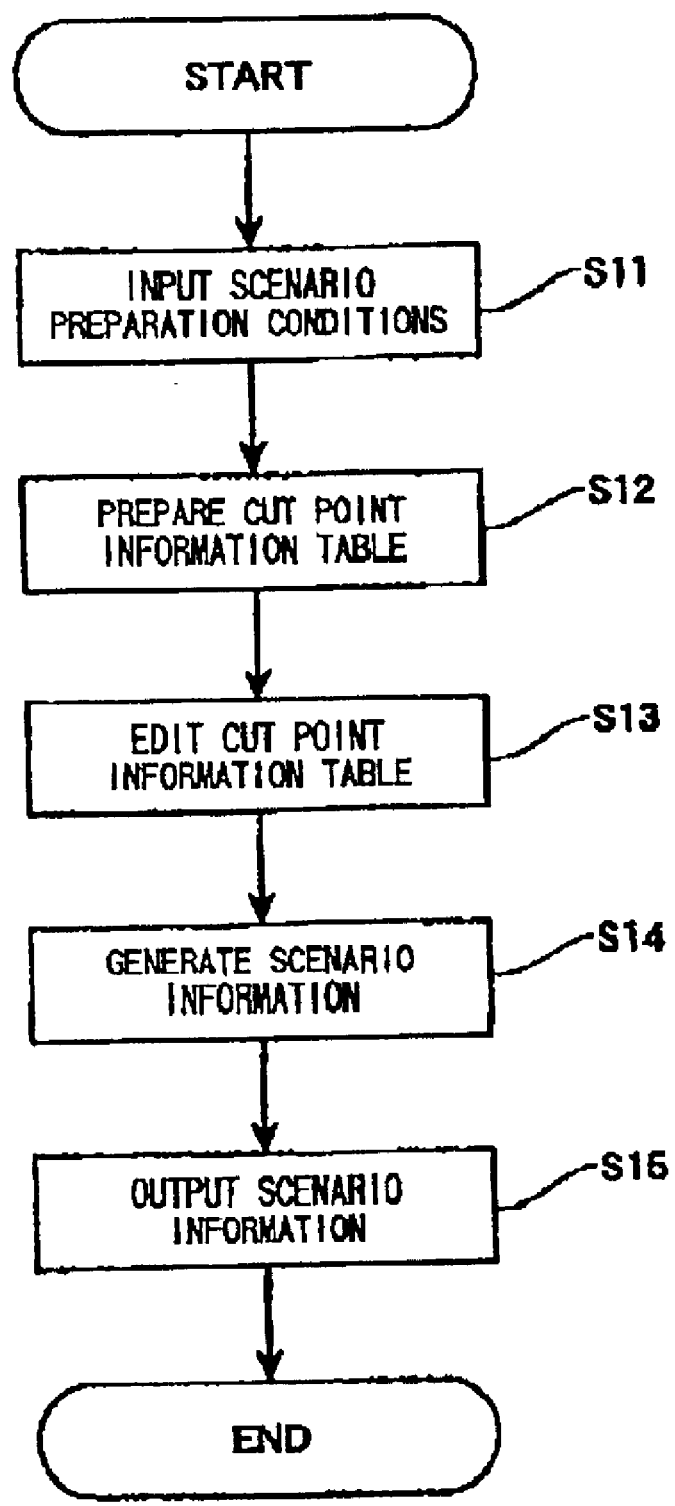
FIG. 3 is a flowchart representing processes performed by the automatic scenario information generating device of FIG. 1.

Next, an explanation will be provided for operation of the automatic scenario generating device A according to the present embodiment, while referring to the flowchart in FIG. 3.

First, the information generating device and consequently the automatic scenario generating device A are started up. Then, in order, the scenario preparation conditions are inputted in S11, the cut point information table is prepared in S12, the cut point information table is edited in S13, the scenario information is generated in S14, and then afterward, the scenario information is outputted in S15. This completes preparation of the scenario information.

Figures 4, 5:
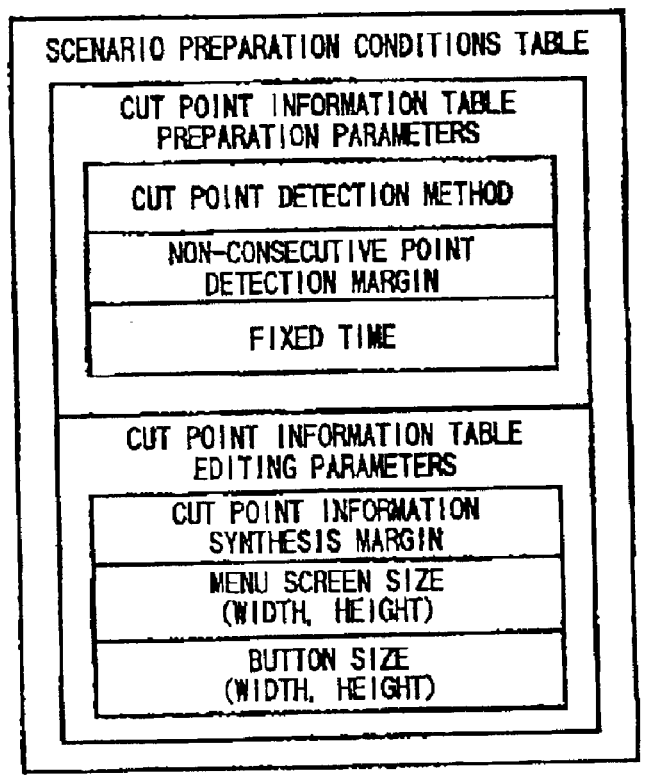
FIG. 4 is a schematic view representing format of scenario preparation condition data.
FIG. 5 is a schematic view showing an example of image elements A to K retrieved for each cut point from a series of image information stored on a video tape.

During input of the scenario generating conditions in S11, the user uses the key board 3 or the mouse 4 to input a variety of data in a form displayed on the display according to the cut point information generating program. FIG. 4 represents a format for the scenario generating condition data stored in the RAM 103. The scenario preparation condition data includes cut point information preparation parameters, and cut point information table editing parameters. The cut point information table preparation parameters include a cut point detection method, a non-consecutive point detection margin, and a fixed time. The cut point information table editing parameters include a cut point information synthesis margin, a menu screen size, and a button size. Different types of data stored in the RAM 103 as shown in FIG. 4 can be retrieved from a prepared file.

During preparation of the cut point information table in S12, the DV deck 5 is controlled by the cut point information table preparation program to input DV recording information from the DV deck 5 across the IEEE1394 interface 8 into the personal computer. The cut point information table preparation program detects cut points from the DV recording information according to the cut point information table preparation parameters of the scenario preparation condition data, prepares a cut point information table, and outputs the cut point information table as a file to the hard disk drive 104.

During the editing of the cut point information table in S13, the cut point information table preparation program retrieves the cut point information table from the hard disk 104 and performs synthesizing processes on the cut point information according to the cut point editing parameters of the scenario preparation condition data. Afterward, the cut point information table preparation program prepares cut point information table editing data and stores it in the RAM 103. According to the present embodiment, the cut point information table editing data stored in the RAM 103 is in the data format termed an object, which has a configuration shown in FIG. 12(A).

During generation of scenario information in S14, the scenario information generation program retrieves the cut point information table editing data and generates scenario information in the RAM 103. During output of the scenario information in S15, the scenario information generation program outputs the scenario information that has been completely generated in the RAM 103 to the hard disk drive 104 as a file. This completes the preparation of scenario information.

The scenario information prepared in the above described manner is input into the scenario information input unit of the authoring device B to produce DVD images in the authoring device B.

Next, the above-described operations for preparing scenario information will be explained in more detail while referring to the flowcharts. First, processes will be explained for preparing the cut point information table from a plurality of image information sets stored in a video tape as video image elements. A cut point includes a playback starting point and a playback stopping point that indicate the playback range when retrieving a portion of an image recorded on a video tape.

The following three methods are used to detect cut points: (1) using non-consecutive points in the recording time, (2) using change points in the recording time, and (3) using fixed interval in a time code. These three methods will be described in more detail.

(1) As an example of using non-consecutive points in the recording time, it will be assumed that recording is first started at 10:00.00 am and stopped at 10:10.00 on August 26. Then, recording is again started thirty minutes at 10:30.00 am also on August 26. As a result, information about recording times recorded on the DV tape will include 10:30.00 on August 26 after the data for 10:10.00 on August 26. This results in a non-consecutive point in information about recording times. According to this detection method, such non-consecutive points are detected and the information from a detected non-consecutive point to a point immediately before the subsequently detected non-consecutive point is considered to be a single piece of cut point information.

(2) As an example of using change points in the recording time, it will be assumed that recording is started at 10:00.00 am on August 26 and continues until 10:10.00 am on August 26. Recording is next started at 10:00.00 am on August 27. As a result, the information about recording time stored in the DV tape will include 10:00.00 am on August 27 directly after the data for 10:10.00 on August 26. According to this detection method, such points where dates change are detected, and information from the change point to a point immediately before the subsequent change point is considered to be a single cut point information set.

(3) According to this detection method, a time code that elapses from a position either where the tape starts or where detection of cut points starts is investigated. A time point when a predetermined fixed duration of time elapses is set to a cut point.

FIGS. 6(A) to 6(C) represent data configuration of a variety of information used for generating scenario information. FIG. 6(A) shows format of DV recording information retrieved using a program of a personal computer for controlling the DV deck 5. The format shown in FIG. 6(A) includes the date recorded as a first condition, the time recorded as a second condition, and a time code, which is the length of a single recorded cut. FIG. 6(B) shows format of cut point information. Cut point information include IN point information, which indicates a start position, and OUT point information, which indicates an end position, of an image in the tape. FIG. 6(C) shows format of a cut point information table recorded as a group of cut point information sets. It should be noted that these formats are produced according to preparation flowcharts to be described later.

Figure 7:
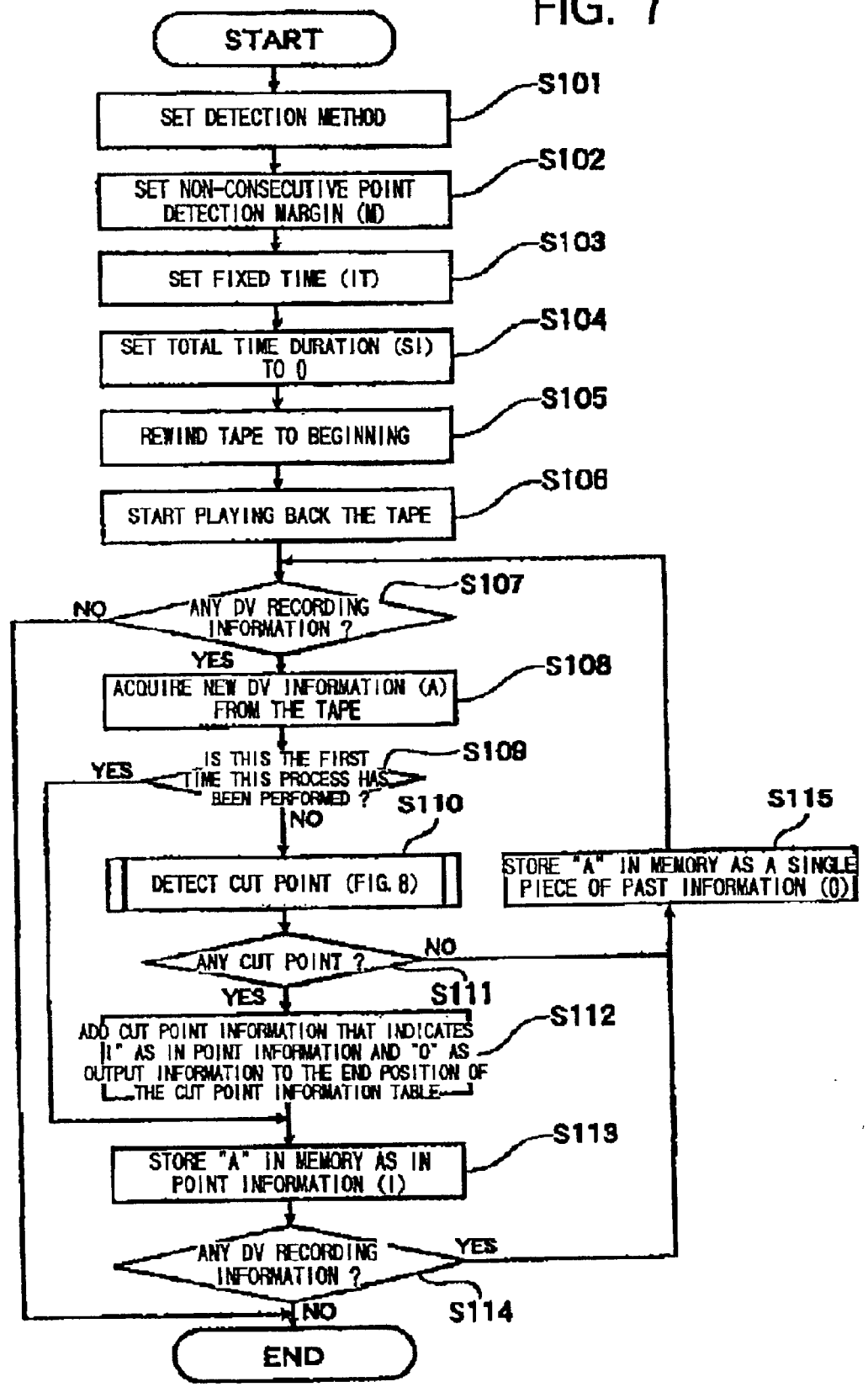
FIG. 7 is a flowchart representing processes for preparing a cut point information table according to the present invention.

FIG. 7 is a flowchart representing processes for preparing a cut point information table according to the present invention. When a video tape recorded by the user is inserted into the DV deck 5 in order to prepare a cut point information table, the personal computer performs the cut point information table preparation routine represented by FIG. 7.

The cut point information table preparation routine of FIG. 7 will be described assuming the video tape includes the information shown in FIG. 5. FIG. 5 shows an example of image elements A to K retrieved for each cut point from a series of image information stored on a video tape. Each element A to K is retrieved as a change point in recording data and/or time.

First in S101 of the flowchart of FIG. 7, data indicating the cut point detection method is retrieved from the cut point information preparation parameters of the scenario preparation condition data inputted using the scenario preparation condition input unit 31. The cut point detection method is set according to the retrieved data. In S102, data indicating the non-consecutive point detection margin M is retrieved from the scenario preparation condition data in the same manner as the cut point detection method. The non-consecutive point detection margin M is to prevent extremely short non-consecutive periods from being considered as non-consecutive points. The non-consecutive point detection margin M is set according to the retrieved data. In S103, data indicating a fixed time IT is retrieved, manner as the cut point detection method. The fixed time IT is for indicating a predetermined time code as a single cut image. The fixed time IT is set according to this retrieved data. In S104, the total time duration SI is set to zero. After this, in S105, the tape in the DV deck 5 is rewound to its start position. It should be noted that a home use video camera can be used instead of the DV deck 5 in S105. In S106, the tape's playback is started.

If the tape is replayed without discovery of any DV recording information (S107:NO), then preparation of the cut point information table is ended. On the other hand, if DV recording information is discovered to exist on the tape (S107:YES), then in S108, new DV recording information A is retrieved from the tape. In S109, it is determined whether or not this is the first time that the DV recording information A has been retrieved, that is, whether or not this is the first time S108 has been performed for the DV recording information A. If it is the first time (S109:YES), then in S113, the data indicating 13:00.00 of the retrieved DV recording information A is stored in a memory (not shown) as IN point information.

In S114, it is determined whether any further DV recording information(B) exists. If no further DV recording information (B) exists (S114:NO), then preparation of the cut point information table is ended. If further DV recording information (B) exists (S114:YES), then in S115, the DV recording information A is stored in the memory as a single piece of past information 1. Next, because the DV recording information B was already once retrieved from the tape in S108, then in S109 it will be determined that this is not the first time that S108 has been performed for the DV recording information B (S109:NO). Therefore, in S110, a cut point detection process is performed. The cut point detection process will be explained later with reference to the flowchart in FIG. 8.

If no cut point is detected in S111 (S111:NO), then the DV recording information B is stored in the memory past information. On the other hand, if a cut point is detected (S111:YES), then the cut point information with 13:00 as IN point information and 14:00 as OUT point information is added to the last position in the cut point information table. In S113, 14:30 of the DV recording information B is stored in the memory as IN point information. S114, it is checked whether further DV recording information C exists. If no further DV recording information C exists (S114:NO), then this routine is ended. If the DV recording information C exists (S114:YES), then in S115, the DV recording information B is stored in the memory as a single piece of past information 2. Then, the routine returns to S107 to determine again if the DV recording information C exists, and the above-described processes are repeated to prepare the cut point information table.

Here, the cut point detection routine will be described while referring to the flowchart of FIG. 8. Cut point detection is performed using the three above-described methods.

Figure 8:
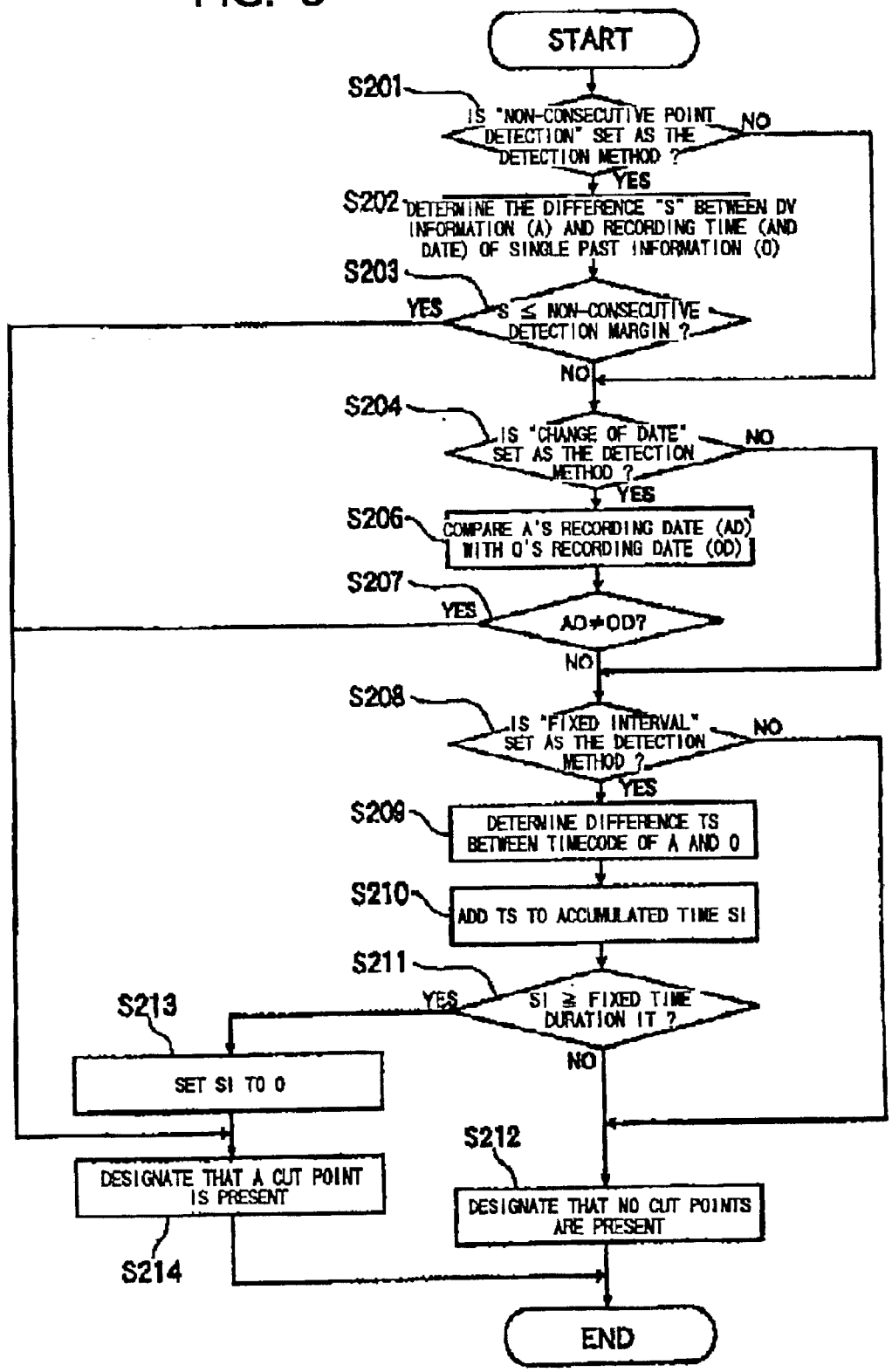
FIG. 8 is a flowchart representing processes performed for detecting cut points.

First, in S201 of the flowchart in FIG. 8, it is determined whether of the three above-described detection methods (1), (2), (3), the detection method (1) is to be used a the detection method, that is, whether or not non-consecutive points in the recording time are to be detected. If non-consecutive points in the recording time are to be used as the detection method (S301:YES), then in S202, the difference S is determined for recording times of DV recording information and a single piece of past information, that is, in this example a difference S of thirty minutes between the DV recording information B and the DV recording information A. In S203, a non-consecutive point detection margin M is determined and compared with the difference S. If the difference S is equal to or less than the margin K (S203:YES), then in S214, it is designated that a cut point is present. On the other hand, if the difference S exceeds the margin M (S203:NO), or if non-consecutive point detection is not set as the detection method (S202:NO), then the program proceeds to S204, where it is determined whether the detection method (2), that is, change points in recording date, is to be used. If the detection method is method (2), that is, change points in the recording data, than in S206, the recording data of the recording information B is compared to the recording date of the single past information A. If the two recording dates are the same (S207:YES), then in S214, it is judged that a cut point exists. If the two recording dates are not the same (S207:NO), or if the detection method is not method (2) (SS204:NO), then the routine proceeds to S208, whereupon it is determined whether the fixed interval (time code) is to be used as the detection method.

If the fixed interval is to be used as the detection method (S208:YES), then in S209, the difference TS between time codes, for example the DV recording information B and the DV recording information A, which is one prior to the DV recording information B, is determined. Then, in S210, the time code difference TS is added to the accumulated time duration SI of the DV recording information.

In S211, the accumulated time duration SI of the DV recording information is compared to the fixed time IT in S211. If the accumulated time duration SI is equal to or greater than the fixed time IT (S211:YES), then in S213, the accumulated time duration SI is set to zero and in S214 it is designated that a cut point exists, whereupon cut point detection is ended. On the other hand, if the accumulated time duration SI is less than the fixed time IT (S211:NO), then in 212 it is designated that no cut point is present, whereupon cut point detection is ended. If point detection is not to be performed using time codes (S208:NO), then in S212 it is designated that no cut point is present, and the cut point detection is ended.

A great number of cut point information sets may be prepared when preparing the cut point information table. For example, a user may first take images from the front of an object, then decide to change the filming angle, stop recording for just a few seconds, and start recording again after moving to the rear of the object. If this type of operation is repeated many times, then non-consecutive points will be generated in the recording time each time the image capturing angle is changed. Even though the images are of the same object, they will be divided up into the several cut points. When the divided images are allotted to means as different blocks, the each block of the images will be reproduced only for a short period of time. In order to prevent this, the following cut point information editing process is performed.

Figure 9:
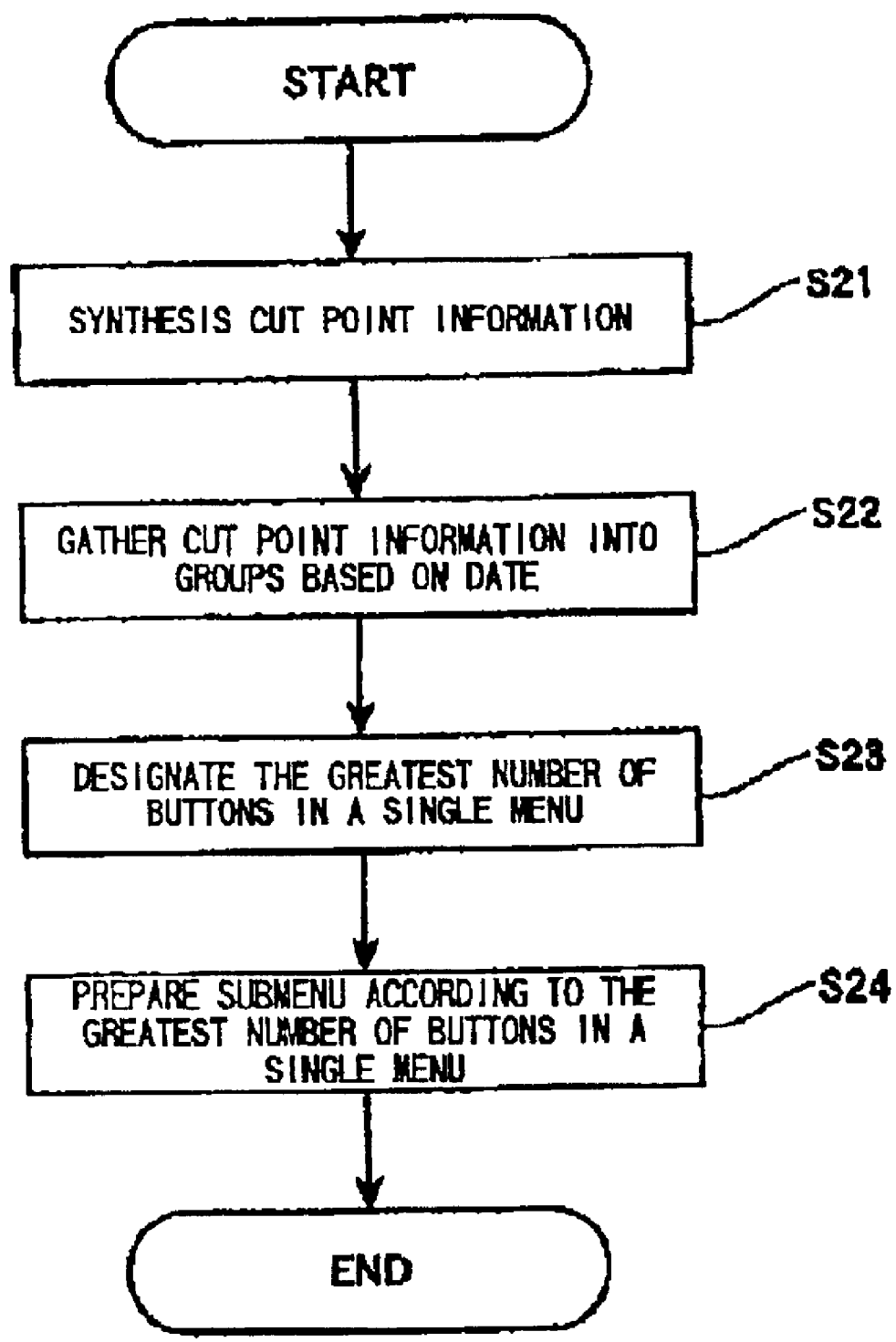
FIG. 9 is a flowchart representing processes for editing the cut point information table of FIG. 6(C)

Next, an explanation will be provided for a series of operations for editing the cut point information table, while referring to the flowchart in FIG. 9.

First, in S21, the image preparation device, and consequently the automatic scenario generating device, are started up, and a routine for synthesizing cut point information is performed. In S22, cut point information sets are grouped together by date. In the process of S22, the cut point information sets are set in data formats termed objects. Objects with cut point information having the same date are grouped together. Details of this operation will be described later while reference to the flowchart in FIG. 10. Next, in S23, the greater number of buttons that can be fitted in a single menu is determined.

During the determination of S23, all cut point information in a single group of cut point information, which have been grouped together by date, will be displayed on a single menu screen of the DVD as a button in the scenario information. The buttons are for selecting a single item from the menu. At this time, when a single button size is preset, then the largest number of buttons that can be disposed within a single menu screen will be automatically fixed, so that sometimes it will be impossible to display all buttons corresponding to the cut point information at one time. For such situations, the processes for determining the largest number of buttons that can be located in a single menu screen are performed. The processes for determining the largest number of buttons will be described later while referring to the flowchart in FIG. 16.

Next, in S24, one or more sub menus are prepared according to the greatest number of buttons that can be displayed in a single menu. The processes of S24 are for dividing the cut point information of each group into more than one sub group according to the largest number of buttons determined in S23, so that the number of buttons displayed in each single menu will be equal to or less than the largest number determined in S23. In the processes of S24, one or more sub menus are added to a menu of the present single group, so that the largest number of buttons or less are displayed in each menu and sub menu. Then, the cut point information for the largest number of buttons or less are redistributed to the sub menus. Detailed explanation of the processes of S24 will be provided later with reference to the flowchart in FIGS. 17 to 19.

In the cut point synthesizing process, the synthesized margin time is set to a value, and two cut point information sets are grouped into a single information set when the length of the non-consecutive point is equal to or less than this synthesizing margin time.

FIG. 10 shows a flowchart representing the cut point information synthesis routine. First, in S301, the cut point information synthesis margin is retrieved from the cut point information table editing parameters of the scenario preparation condition table, which was inputted using the scenario preparation condition input unit 31. The cut point information synthesis margin is set as a synthesis margin GM. Next, in S302, a variable N is set to one. Then, in S303, cut point information A, which is associated with data number 1, is retrieved. In S304, the cut point information B, which is associated with data number 2, is retrieved. In S305, the difference between the IN point recording time of the cut point information B and the OUT point recording time of the cut point information A is determined. In S306, the difference C is compared with the synthesis margin GM. If the difference C is smaller than the synthesis margin GM (S306:YES), then in S307, the IN point information of the cut point information A is set as the IN point information of the cut point information B. In S308, the cut point information A is deleted. In S309, the variable N is incremented by one, which in this example results in the variable N being incremented to two. In S310, it is judged whether or not the variable N is greater than the number of cut point information sets. If more cut point information sets exist (S310:NO), then the routine returns to S303, whereupon subsequent cut point information is retrieved and the above-described processes are again repeated. If no more cut point information exists (S310:YES), then the routine skips S311 (where the variable N would be set back to one) and repeats S312 to S316, which are for associating a new number with a newly grouped together cut point information.

If the difference S is not less than the synthesis margin GM (S306:NO), then in S309, the variable N is incremented by one, that is, is increased to two in this example. Then in S310, the variable N is compared with the cut point information number, which is the total number before the information was deleted in S308. In this example, the variable N will not be larger than the cut point information number (S310:NO), so the routine returns to S303, whereupon the cut point information B associated with the data number 2 is retrieved, and then the cut point information C associated with the data number 3 is retrieved, and cut point information synthesis is performed in the same manner as described above.

For example, assume that the user records the image of an object from the front, stops recording for about five seconds to change the recording angle, and then starts recording images of the object from the rear. If the synthesis margin is set to 10 seconds in this case, then the images of the object from the front and the object from the rear will be designated with cut point information as contents for a single image.

FIG. 11 shows a list of cut point information sets grouped together by time period and date.

Scenario information is generated using the cut point information table prepared in the above-described manner. How the scenario information is generated will be described later. However, processes for generating the scenario information start by preparing the cut point information table editing data, which has data configuration of an object, from the cut point information table.

Figure 12:
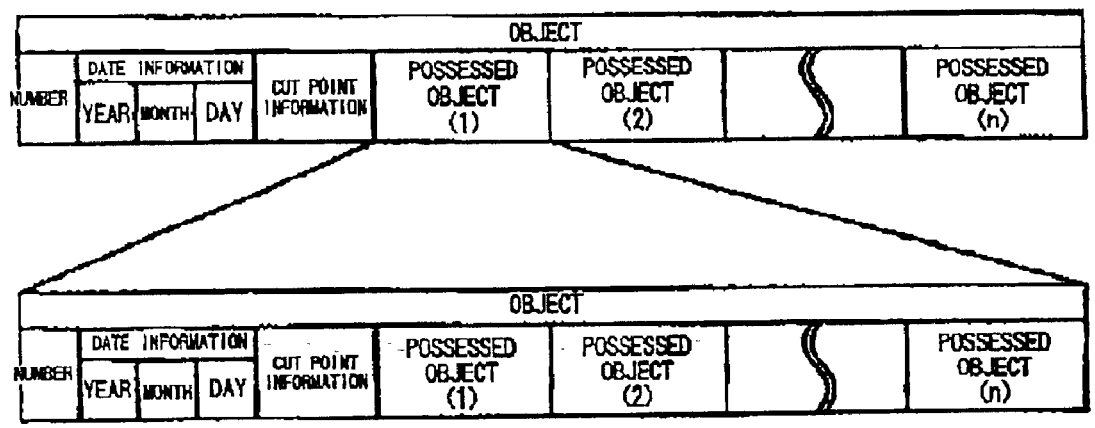
FIG. 12(A) is a schematic view showing configuration of objects.
FIG. 12(B) is a schematic view showing hierarchal structure of objects.
Figure 12:
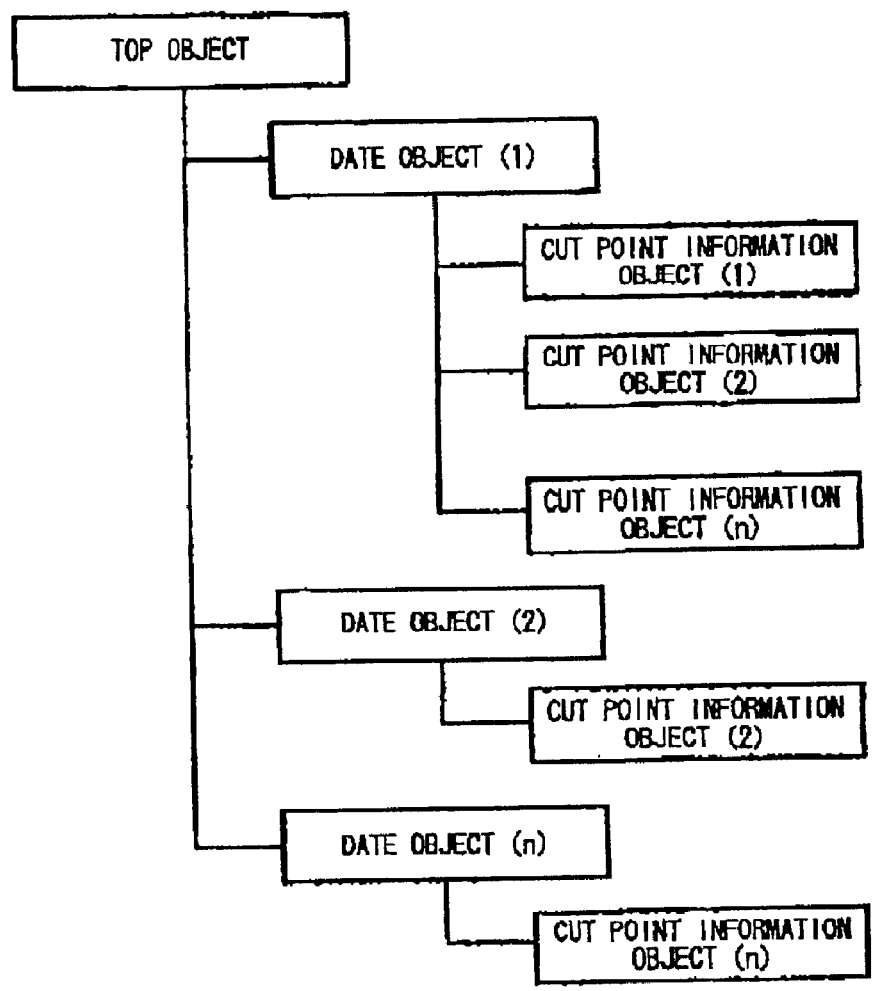
Figure 13:
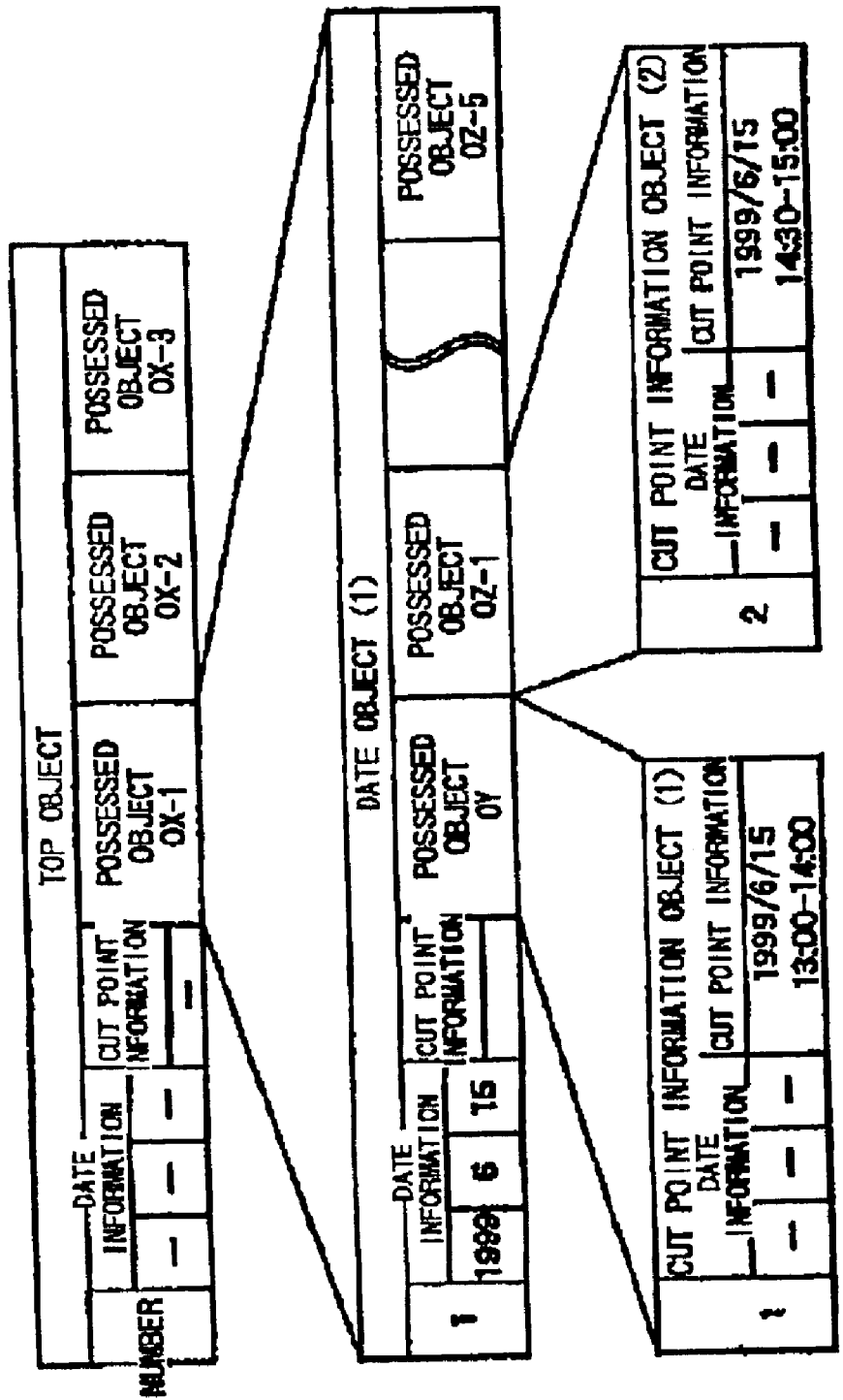
FIG. 13 is a is a schematic view showing configuration of objects.

FIG. 12(A) shows data configuration of objects. As shown, each object includes an object number, date information, cut point information, and possessed objects. Each object has a unique format of including other objects as data, with the same configuration as the present object. FIG. 12(B) shows hierarchical configuration of various objects. As shown, a TOP object includes date objects. Each date object further includes cut point information objects. FIG. 13 shows data configuration of objects having such a hierarchical configuration. Possessed objects in the top object are data objects, and possessed objects of the date objects are cut point information objects.

Figure 14:
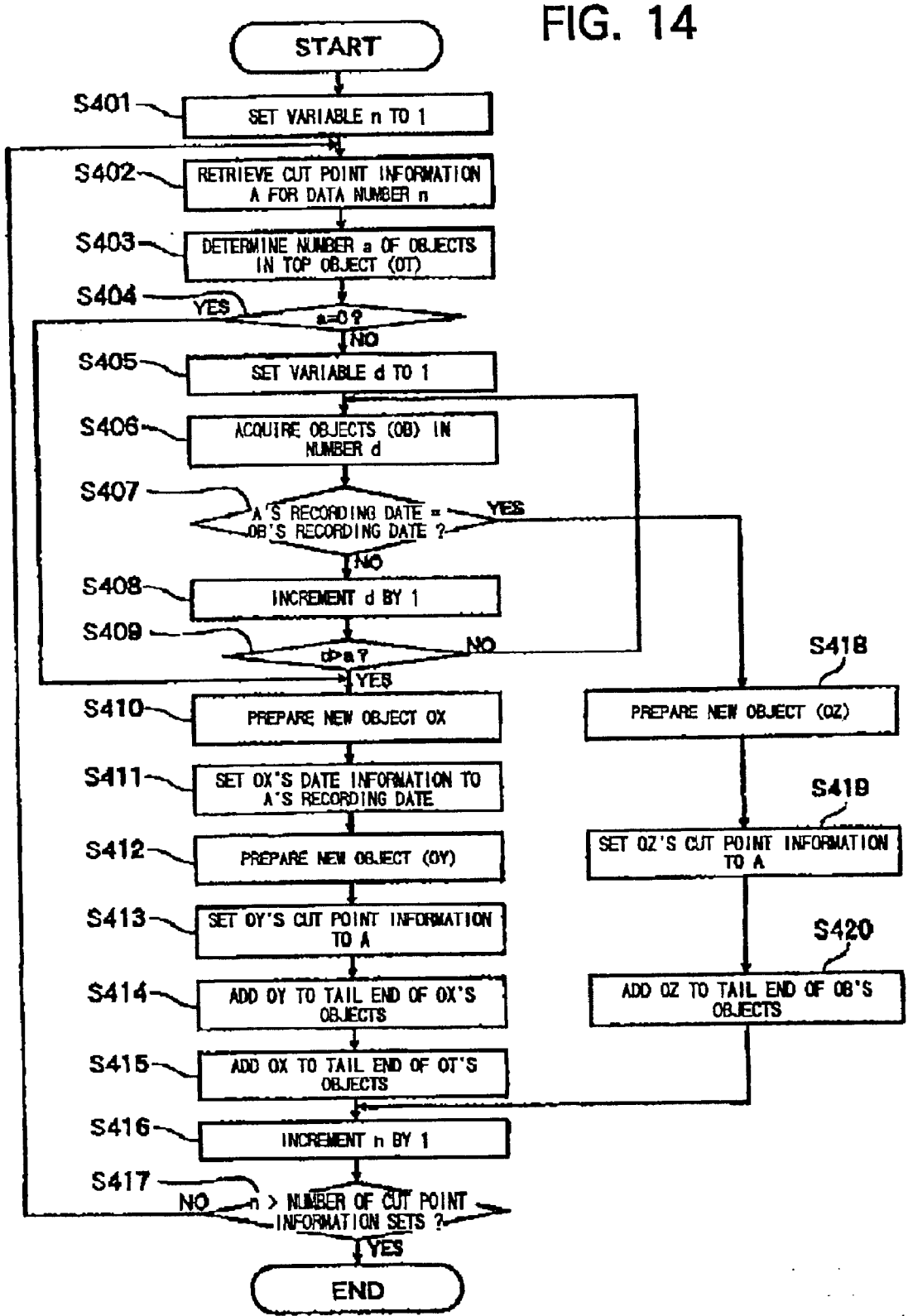
FIG. 14 is a flowchart representing processes for preparing object configuration from the cut point information table.

FIG. 14 is a flowchart representing processes for preparing object configuration from a cut point information table. In summary, first a TOP object is prepared. Then data objects are prepared in the TOP object in a number equivalent to the different number of recording dates included in the IN point information of cut point information. The recording date is stored in the date information of each date object. Next, the cut point information sets are retrieved one after the other from the cut point information table, and a cut point information object that stores the cut point information is prepared in a date object that has the same date information as the recording date of the IN point information. Cut point information objects are added in this manner. Objects are repeatedly prepared by dividing regions until all cut point information included in the cut point information table is prepared in each of the date objects as cut point information object.

Next, processes for preparing objects with the object configuration shown in FIG. 13 will be explained in detail while referring to the flowchart in FIG. 14. In the following explanation, cut point information data shown in FIG. 11 in association with numbers 1, 2, 3, and so on will be referred to as cut point information A1, A2, A3 and so on, respectively.

First, the cut object is prepared. In S401, a variable n is set t one. In S402, the first cut point information set A1 is retrieved. In S403, the number a of possessed objects in the TOP object is determined. In this example, the processes are just started, so the TOP object includes no possessed objects yet. The number a is zero accordingly. In S404, it is judged whether or not the number a equals zero. In this example, since a equals zero (S404:YES), then in S410 a new object OX, which is an empty container at this point, is prepared. As shown in FIG. 13, the object OX of the TOP object is the date object (1). Next, in S411, the recording date of the cut point information A1 is set as the date information of the object OX. In S412, an object OY, which is an empty container at this time, is newly prepared in the object OX. As shown in FIG. 13, the object OY of the object OX is the cut point information object (1). In S413, the cut point information A1 is set to the object OY. In S414, the object OY is added to the tail end of the possessed object of the object OX. In this example, the tail end of the possessed object of the object OX is the position of the object OY as shown in FIG. 13. In S415, the object OX is added to the tail end of the possessed objects of the TOP object. In this example, the tail end of the possessed objects of the TOP object is the position of the object OX-1 as shown in FIG. 13. In S416, the variable n is incremented by one, that is, is increased to two in this example. In S417, the variable n is compared to the number of cut point information sets to determine whether the variable n is greater than the number of the information sets. In this example, the variable n equals two and the number of the cut information sets equals six, so that S417 results in a negative judgment.

In S402, the second nth cut point information sets is retrieved. In this example, the second cut information set A2 is retrieved. In S403, the number a of the possessed objects of the TOP object is determined. In this example, at this point, the TOP object includes only a single possessed object OX-1, so number a is equals to one at this point. In S404, it is determined whether number a is equal to zero, in this example, number a equals one, so S404 results in a negative judgment. In S405, a variable b is set to one. In S406, the object (1), that is, the first possessed object of the cut object, is acquired. In S407, the recording date of the cut point information A is equal to the date of the possessed object (1). In this example, both have the same date of Jun. 15, 1999, so S407 results in a positive judgment. As a result, the routine proceeds to S418, whereupon an empty object OZ is newly acquired. Next in S419, the cut point information A2 is set as the cut point information of the object OZ. In S420, the object OZ is added to the tail end of the possessed object (1), that is, the position indicated by OZ-1 in FIG. 13. In S316, the variable n is incremented by one, resulting in the variable n equaling three in this example. These processes are repeated until the cut point information number reaches six in this example.

If it is determined in S407 that the recording date of the cut point information differs from the date of a possessed object (S407:NO), then in S408, the variable d is incremented by one. Then, in S409, it is determined whether the variable d is greater than the variable a. In this example, it will be assumed that the variable d is incremented by one to reach two in S408, so that S409 results in a positive judgment (2>1). In this case, as a result of S410 to S415, a date object (2) is added as a possessed object to the cut object. The date object (2) is the possessed object OX-2 shown in FIG. 13, and includes a cut point information object number 7. Afterward, in S402, the next cut point information set, that is, the cut point information number 8, is retrieved. In this example, when the variable d equals one, the date of the possessed object (1) of the TOP object differs from the date of the cut point information. Therefore, the routine will proceed S408 after S407, whereupon the variable d is incremented by one to two. As a result, S409 will result in a negative judgment (two is not greater than two) so that the second of the number two possessed object (2) is acquired in S406. Because the date of the second possessed object (2) is Jun. 16, 1999, S407 will result in a positive determination because the date of the number eight cut information is also Jun. 16, 1999.

Next, the cut point information number eight to number ten is entered into the possessed object (2), and an object OX, which at this point is an empty container, is newly prepared. In S411, the recording date of the cut point information A is set in the date information of the object OX.

By repeating these operations, the object configuration shown in FIG. 12(B) is prepared and all cut point information in the cut point information table is stored in the object configuration. Scenario information is then generated based on the object on these objects.

Figure 15:
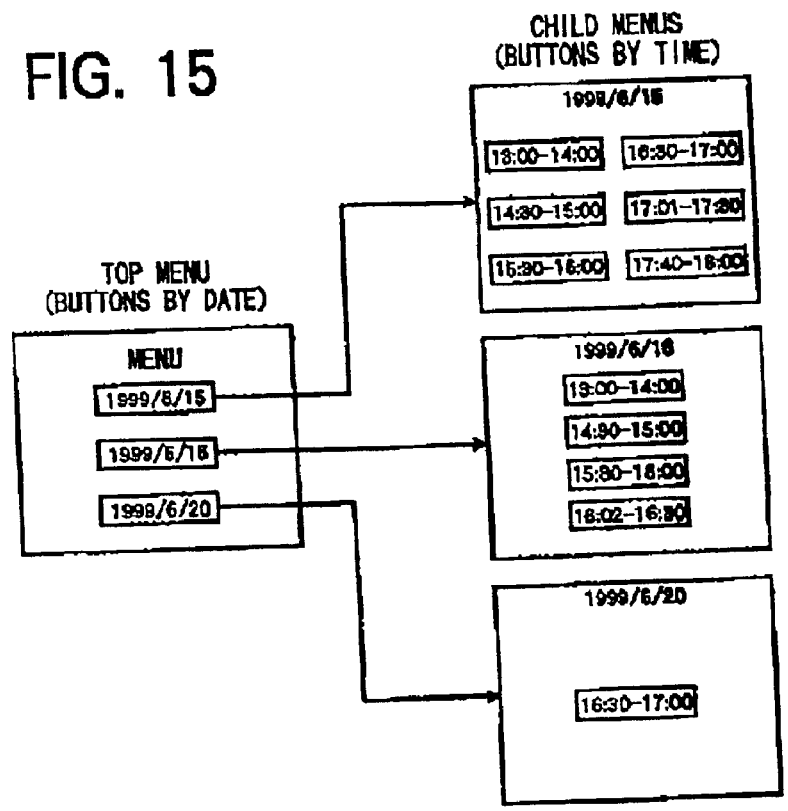
FIG. 15 is a schematic view showing an example of menus displayed on a screen for images grouped together by time and date.

FIG. 15 shows an example of menus prepared from the original cut point information shown in FIG. 5 according to the object preparation routine, and displayed on the screen of a CRT, for example. The dates and time displayed on the menus serve as buttons that when clicked on using a mouse, retrieve images recorded at the time and data indicated on the clicked button, so that the user can view the images.

Sometimes, a large number of buttons are displayed on a single menu. For example, if a user records images on 30 different occasions on the same day, then 30 different cut point information sets will exist for the same recording data. In this case, when the scenario information is prepared based on these objects and the menu is displayed, then one single menu will include 30 different buttons. This makes the menu difficult to read, so the user will have difficulty in selecting a desired image. Also, when the size of the single menu screen and the size of a single button are predetermined, then the number of buttons that can fit within a single menu screen will be automatically determined, and it is impossible to fit more buttons into a single menu. For example, when the menu size is set to 720 dots times 480 dots, then only nine buttons, that is, three columns and three rows, can fit in the single menu screen.

Figure 16:
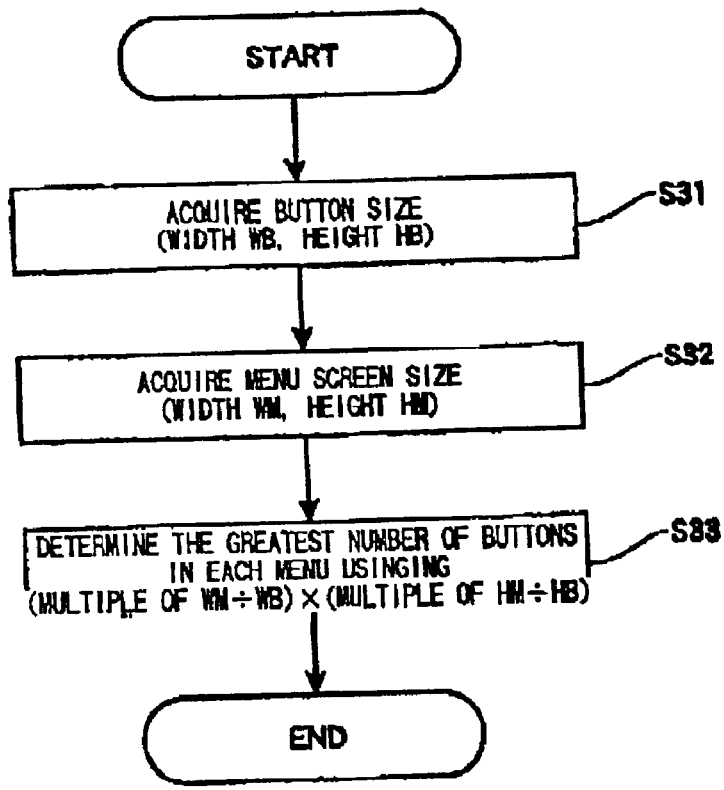
FIG. 16 is a flowchart representing processes for determining the greatest number of buttons that can be displayed in a single menu.

Next, an explanation will be provided for a method for determining a maximum number of buttons that can fit in a single menu based on the size of the menu screen and the size of a single button. FIG. 16 is a flowchart representing processes for determining the maximum number of buttons that can fit in a single menu. As shown in FIG. 16, once the information preparation device, and consequently the automatic scenario generating device, is started up, then in S31, the button size is acquired. That is to say, a button width WB and a button height HB are acquired from the button size data in the cut point information table editing parameters in the scenario preparation condition table shown in FIG. 5. Next, in S32, the menu screen size is acquired. That is to say, the menu screen width NM and the menu screen height HM are acquired from the menu screen size of the cut point information table editing parameters of the scenario preparation condition table shown in FIG. 4. In S33, the greatest number of buttons that can fit in each menu is determined by the following formula:

(an integral part of the menu width *WN*/the button width *WB*)×(an integral part of the menu height *MH*/the button height *HB*).

Next, processes for limiting the number of buttons in each menu screen are performed using the above-described process. By performing these processes, one or more sub menus is added to each menu, and cut point information from the menu is transferred to the corresponding sub menus. As a result, it is possible to limit the number of buttons in each single menu to equal to or less than a predetermined number.

Figure 17:
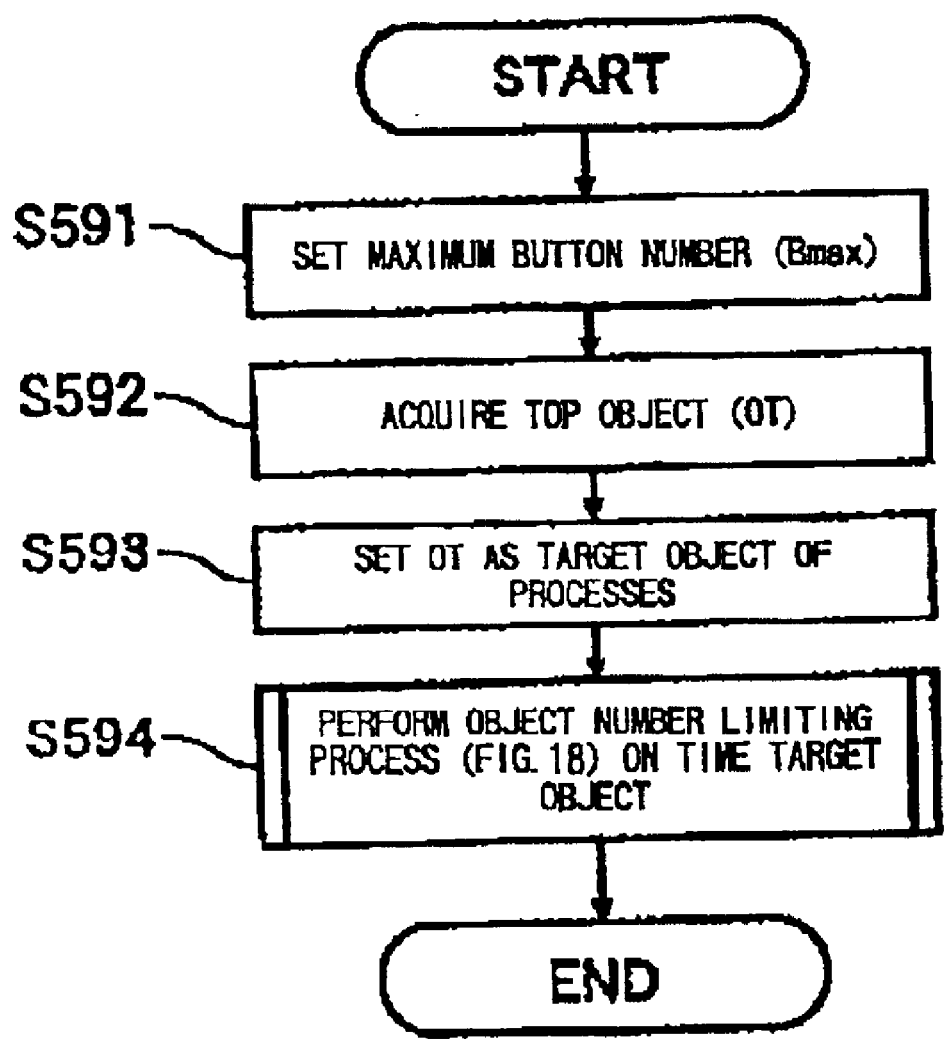
FIG. 17 is the flowchart representing processes for limiting the number of possessed objects in each object to a designated number or less.

The processes for limiting the number of buttons in each menu screen will be described while referring to FIGS. 17 to 19. FIG. 17 is the flowchart representing processes for limiting the number of possessed objects in each object to a designated number or less. First, in S591 in FIG. 17, a maximum button number Bmax is determined using the greatest-button-number-in-a-single-menu determining program. Next in S592, a TOP object OT is acquired. In S593, the TOP object OT is set an the target object of the following processes. In S594, the processes for limiting the number of objects in the target object are performed.

Figure 18:
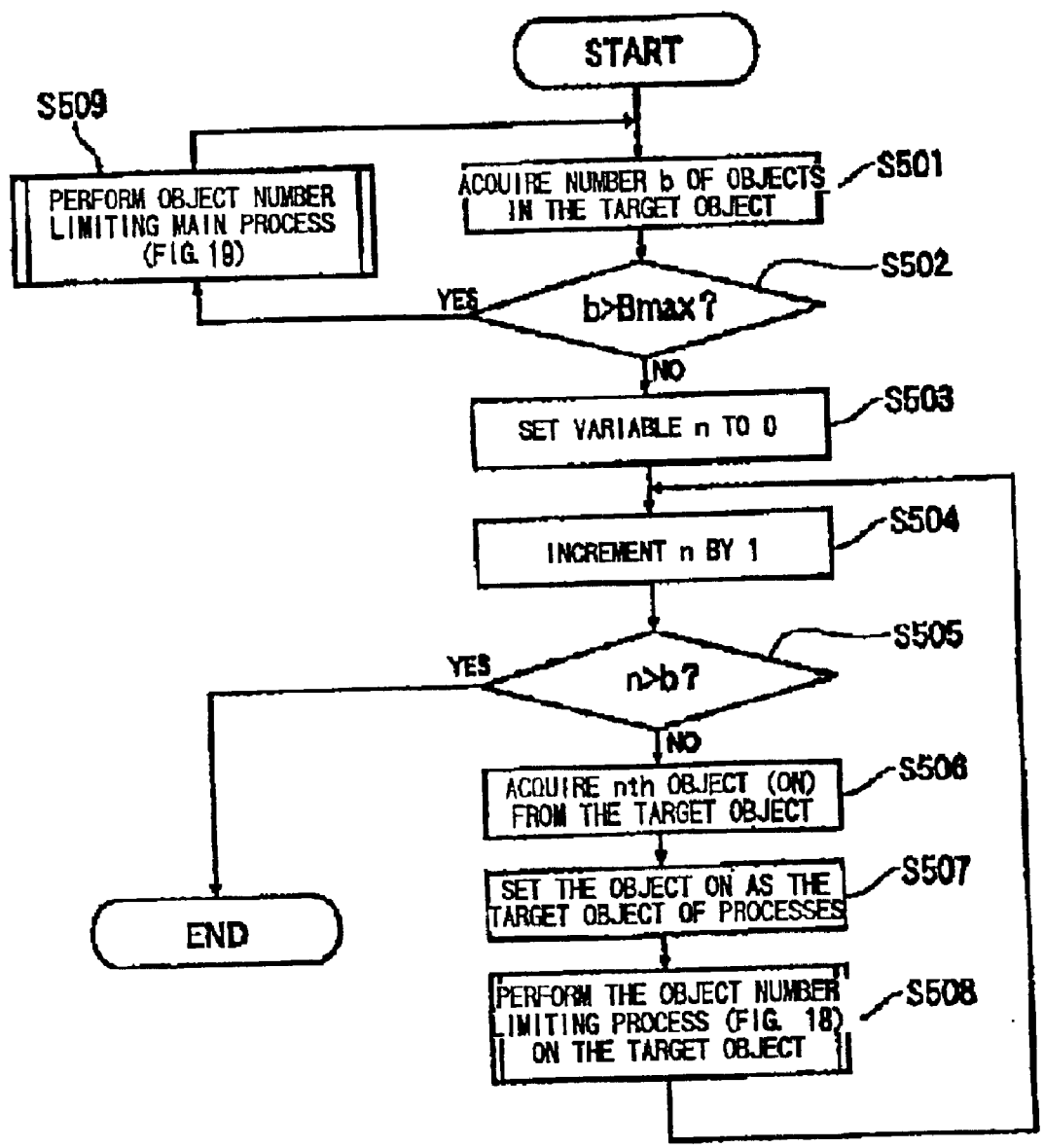
FIG. 18 is the flowchart representing the processes for limiting the number of objects.

FIG. 18 is the flowchart representing the processes for limiting the number of objects. These processes will be described in detail while referring to the cut point information shown in FIG. 11, and assuming that the maximum number of buttons is four. First, in S501, a number b of possessed objects in the target object is acquired. In this example, the number b is three. Next, in S501, the possessed object number b is compared with the maximum button number Bmax. In this example, the maximum button number Bmax is four. As a result, in S507 it is determined that the possessed object number b is not greater than the maximum number Bmax (three is not greater than four). As a result, the routine proceeds to S503. If S507 results in a positive determination, then a main process for limiting the number of objects will be performed in the manner represented by the flowchart in FIG. 19. In S503, a variable n is set to zero. In S504, the variable n is incremented by one. In S505, the variable n is compared with the possessed object number b to determine whether or not the variable n is larger than the possessed object number b. In this example, the variable n is not greater than the possessed object number b (one is not greater than three), so the program proceeds to S506, whereupon the Nth possessed object is acquired from the target object. In this example, a equals one, so the first possessed object (1) is acquired from the TOP object in S506. Next, in S507, the possessed object (1) is designated as the target object. Then, in S508, the object number limiting routine is again retrieved and performed with respect to the possessed object (1).

Next, in S504, n is incremented by one to two. Next, in S505, it is judged whether or not two is greater than three, which results in a negative determination, so the routine proceeds to S506. In S506, the second possessed object (2) is retrieved from the target object. In S507, the possessed object (2) is set as the target object. In S508 the object number limiting routine is again recalled and performed with respect to the possessed object (2). The above-described processes are again performed in the same manner until the variable n reaches four, whereupon the judgment in S505 will result in a positive determination (four in greater than three), and the object number limiting processes are completed.

Figure 19:
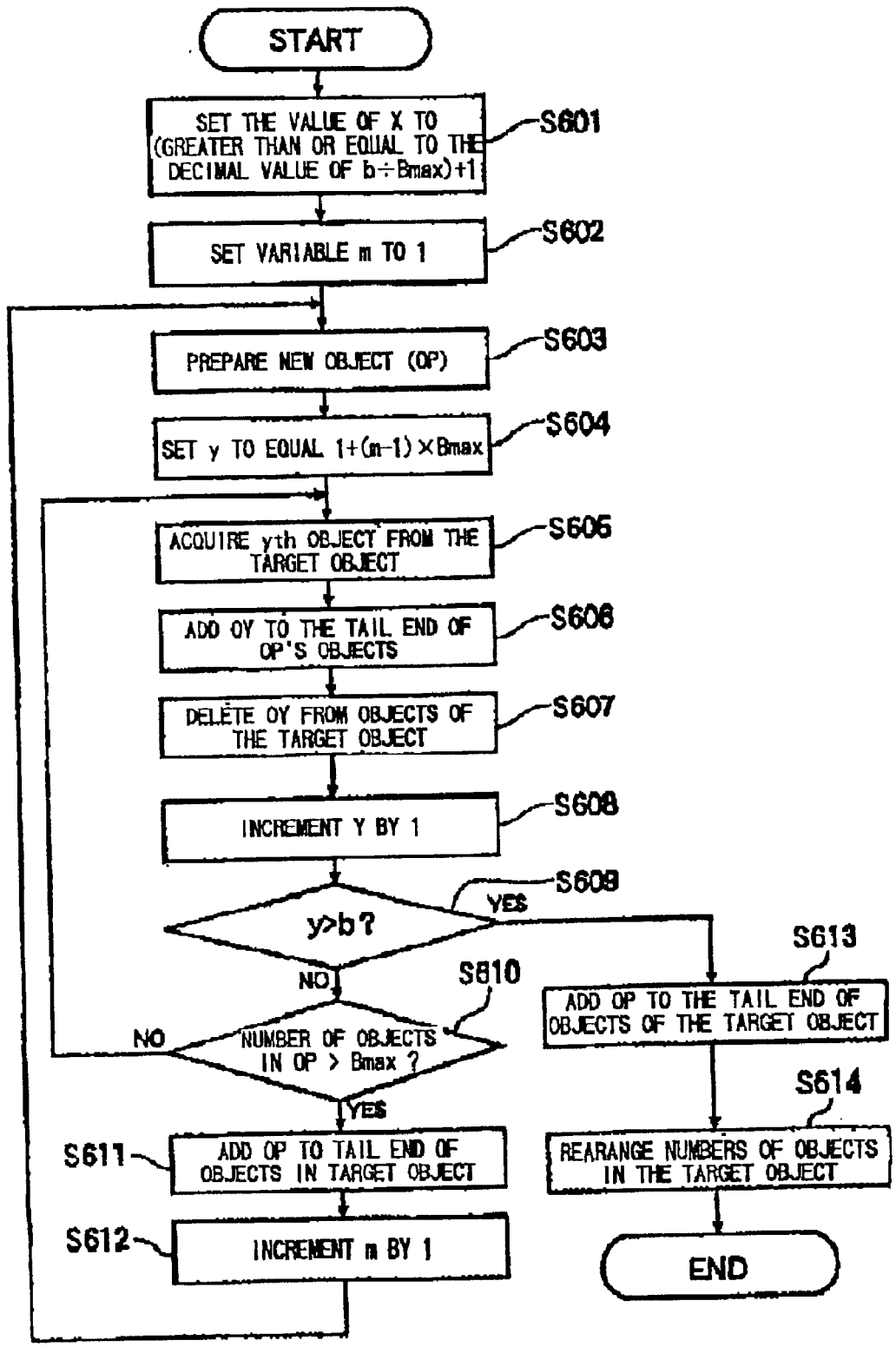
FIG. 19 is a flowchart representing processes for preparing sub menus according to the maximum number of buttons that can fit in each menu.
Figure 20:
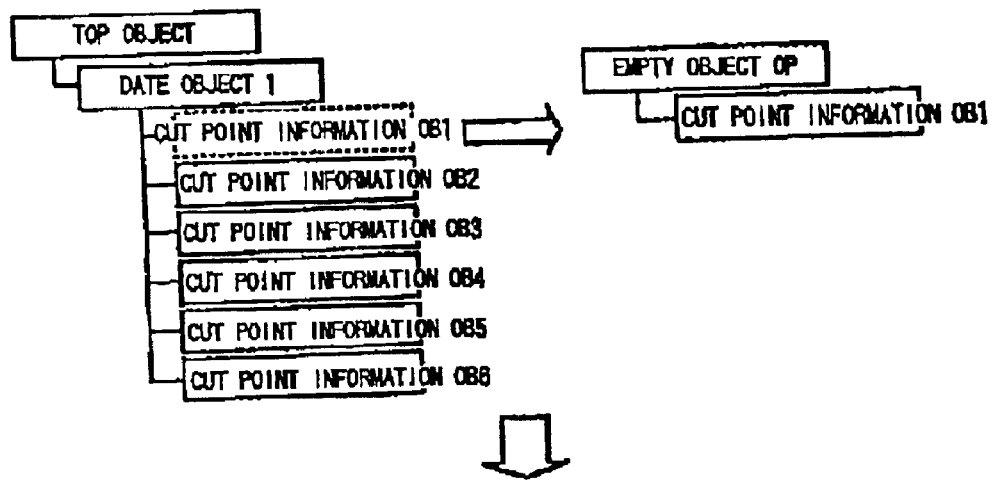
FIG. 20(A) is a transition diagram of object configuration.
FIG. 20(B) is another transition diagram of object configuration.
FIG. 20(C) is still another transition diagram of object configuration.
Figure 20:
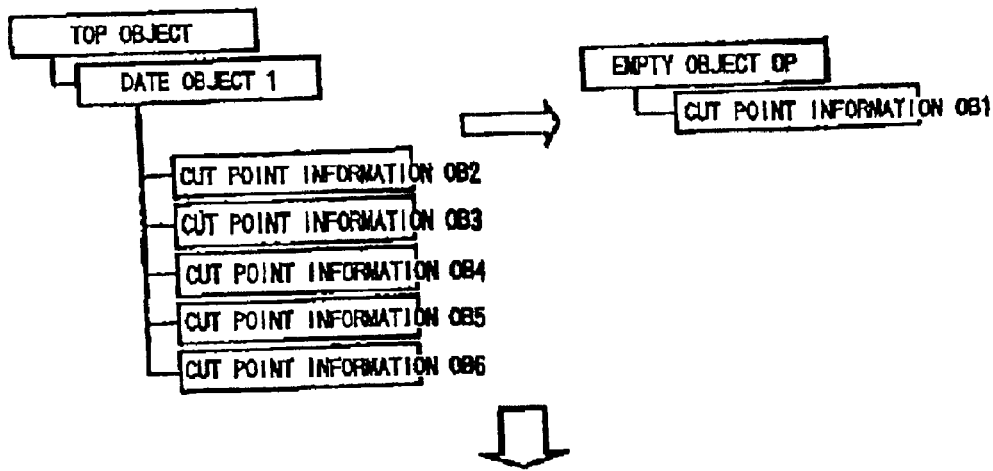
Figure 20:
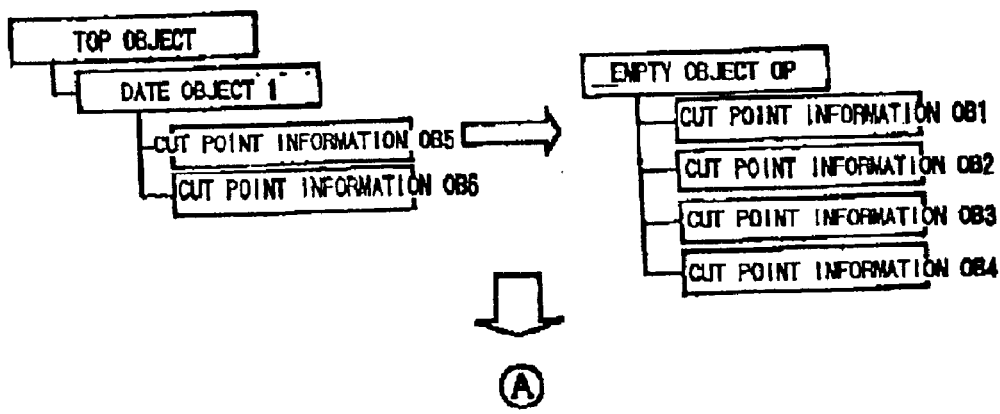

FIG. 19 is a flowchart representing the main portion of the processes for preparing sub menus according to the maximum number of buttons that can fit in each menu. In this explanation it will be assumed that the cut point information has the configuration represented in FIG. 11, and will be explained while referring to FIGS. 20 to 11. The date objects shown in FIGS. 20 and 21 correspond to menus and the empty objects OP shown in FIGS. 20 and 21 correspond to sub menus. When the object number limiting processes start, first, a value x is determined to designate how many objects the target object should be divided into. In the present example, the target object is the possessed object possessed by the date object (1) shown in FIG. 20. The value x is determined in S601 by dividing the number of objects b by the maximum number of buttons Bmax and rounding up the result to the next highest integer. In this example, b equals 6 and Bmax equals four, so value x is set to one. However, it should be noted that when the formula in S601 does not result in an integer, then one is added to x so that, in the present example, x is set to two. Next in S602, a variable m is set to one. Then in S603, an empty object OP is newly produced. Neat, is S604, it is determined which possessed object of the target object is to be the possessed object to come first in the divided object. This is determined using the formula Y=1+(m−1)×Bmax, which in this example is Y=1−(1−1)×4, that is, Y=1. Therefore, in S605, the first possessed object, that is, the cut point information object 1, of the target object, that is, the date object (1) in FIG. 20(A), is acquired. Next, in S606, the cut point information object (1) is added to the empty object OP. In S607, the cut point information object (1) is then deleted from the date object (1). At this time, the hierarchy of the different object appears as shown in FIG. 20(B).

Next, in S608, y is incremented by one, that is, in this example, y raised to two. Next, in S609, y is compared to b to determine whether y is greater than b. In this example, S609 results in a negative determination (two is not greater than six), so the program proceeds to S610, whereupon it is determined whether the number of possessed objects in the empty object OP is greater than or equal to the maximum number of buttons Bmax. In this example, S610 results in a negative determination (one is not greater than or equal to four), so the program returns to S605, whereupon the cut point information object (2) is added to the empty object OP. In S607, the cut point information object (2) is deleted from the date object (1). In S609, y is incremented to three. In S609, it is judged that three in not greater than six. In S610, it is judged that the number of possessed objects (2) in the empty object OP is not greater than or less than four. In S605, the cut point information object (3) is acquired from the data object. In S606, the cut point information object (3) is added to the empty object OP. In S607, the cut point information object (3) is deleted from the date object (1). In S609, y is incremented by one to four. To S609, it is judged that four is not greater than six. In S610, it is judged that the number, that is, three, of objects in the empty object OP is not greater than or equal to four. In S605, the cut point information object 4 is acquired from the date object. In S606, the cut point information object (4) is added to the empty object OP. In S607, the cut point information object (4) is deleted from the date object (1). In S608, y is incremented by one to five. In S609, it is judged that five is not greater than six. In S610, it is judged that the number (4) of objects in the date object OP is greater than or equal to four. At this point, the objects have the appearance shown in FIG. 20(C).

In S611, the empty object OP is added to the tail end of the date object (1). At this point, the objects are configured as shown in FIG. 21(A).

In S612, m is incremented by one to two. In S603, an empty object OP2 is newly prepared. In S604, which possessed object of the target object will be the first possessed object in the divided object is determined using the formula:

$$y=1+(m-1)^x \text{Bmax}.$$

Figure 21:
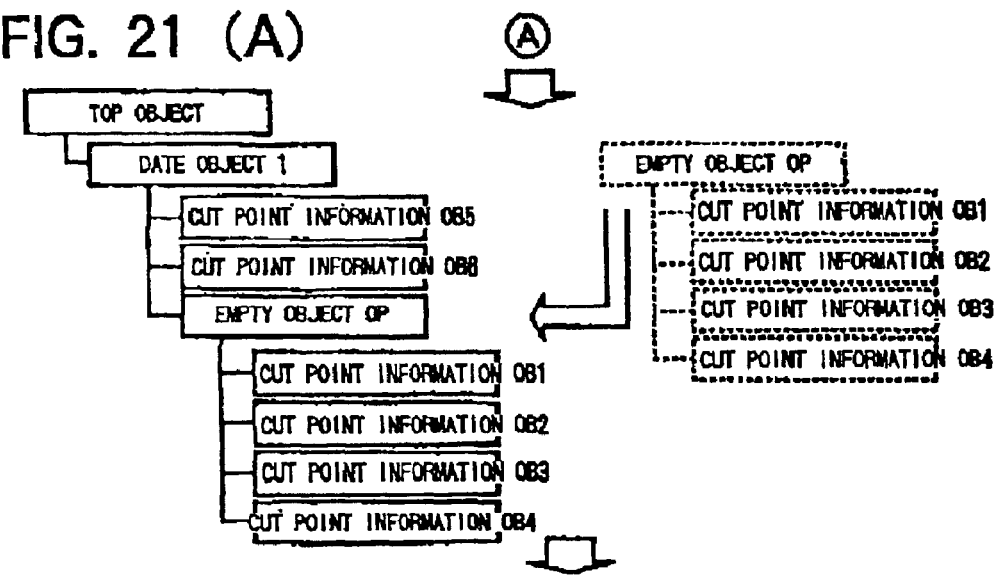
FIG. 21(A) is a transition diagram of object configuration.
FIG. 21(B) is another transition diagram of object configuration.
FIG. 21(C) is still another transition diagram of object configuration.
Figure 21:
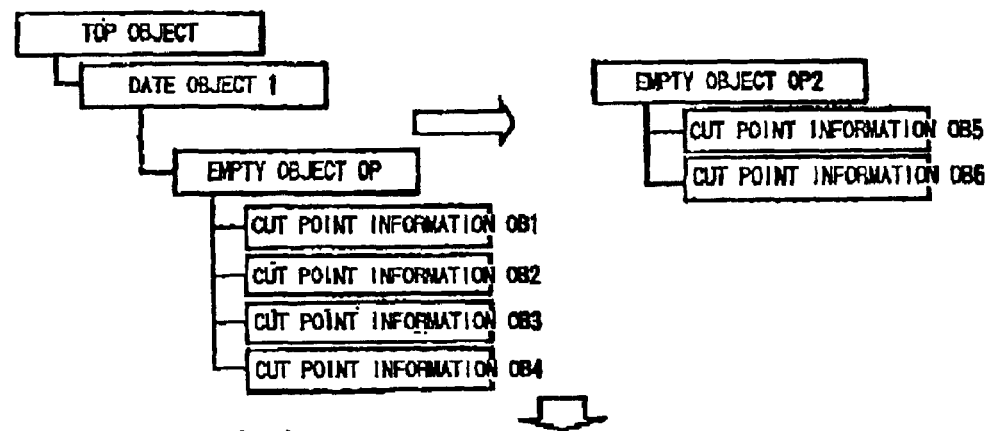
Figure 21:
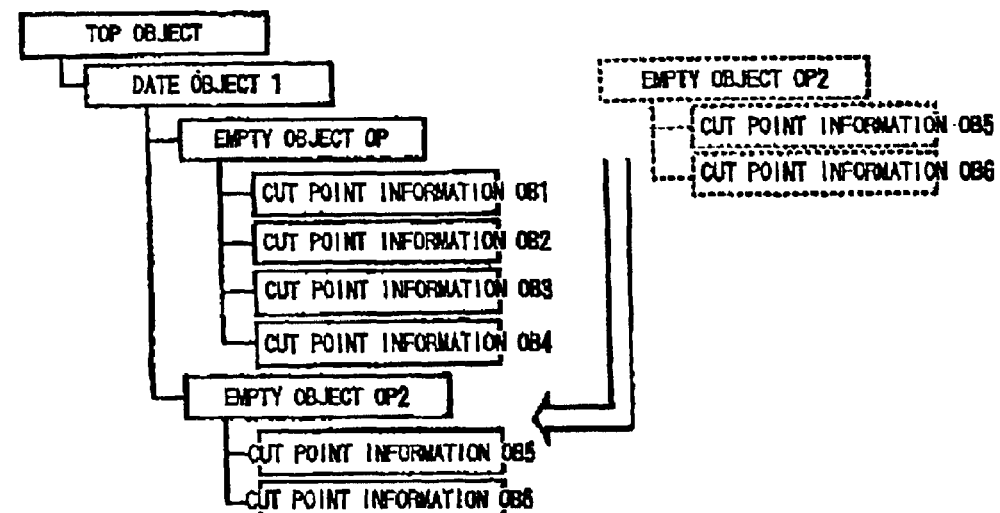

In this example, Y=1+(2−1)×4, that is, y=5. In S605, the fifth possessed object, that is, the cut point information object (5) in FIG. 21, is acquired from the date object (1). In S605, the cut point information object (5) is added to the empty object OP2. In S607, the cut point information object (5) is deleted from the date object (1). In S608, y is incremented by one to six. In S609, it is determined that six is not greater six. In S610, it is determined that the number, that is, one, of possessed objects in the empty object OP2 is not greater than or equal to four. In S605, the cut point information object (6) is acquired from the date object (1). In S606, the cut point information object (5) is added to the empty object OP2. In S607, the cut point information object (6) is deleted from the object (1). In S608, y is incremented to seven. In S609, it is judged that seven is greater than six. At this point, the object configuration has the appearance as shown in FIG. 21(B).

As a result of a positive judgment in S609, the routine proceeds to S613, whereupon the empty object OP2 is added to the tail end of the object (1). As a result, at this point, the object hierarchy has the appearance shown in FIG. 21(C). In S614, the possessed objects of the date object (1), that is, the empty object OP and the empty object OP2, are given the numbering of one and two, respectively, and these processes are ended.

Figure 25:
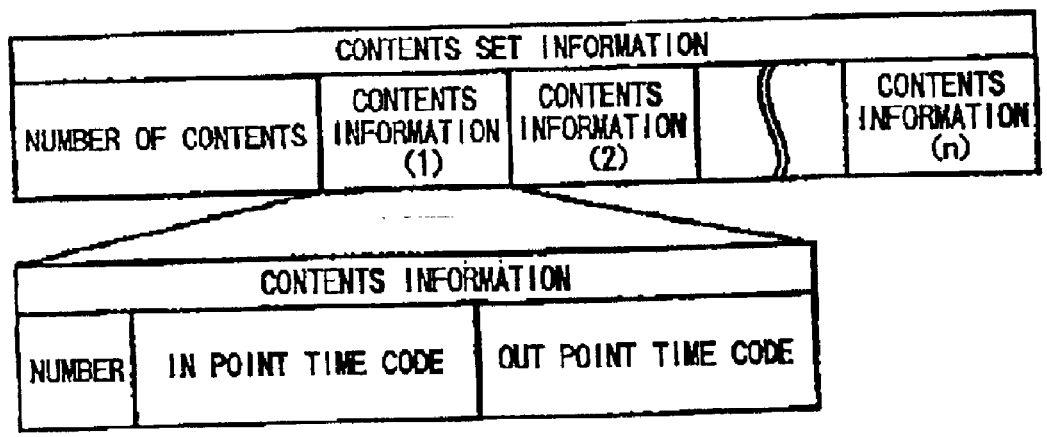
FIG. 25 is a schematic view showing format of contents set information.
Figure 26:
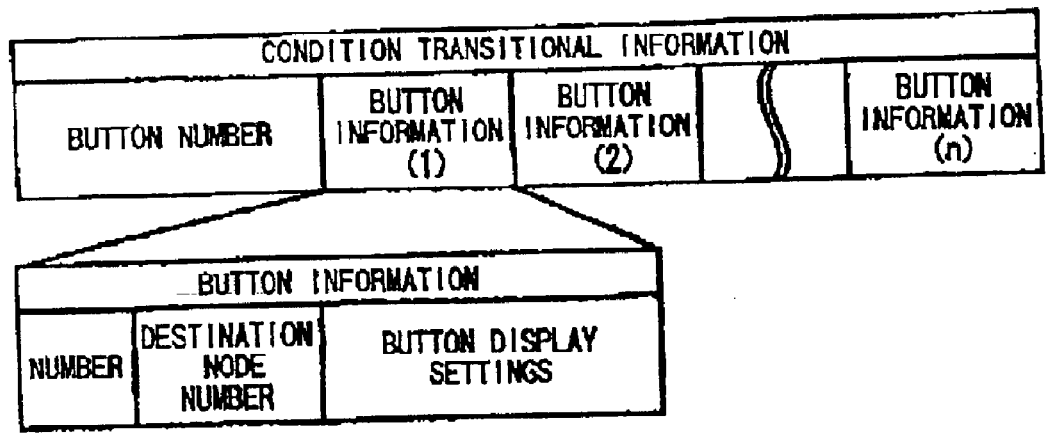
FIG. 26 is a schematic view showing format of condition transition information.

Scenario information includes subject matter required to configure the contents of a multimedia optical disk. This subject matter includes information relating to images, menu back ground images, button design, and relationship between buttons and images. Node information, menu information, contents sets information, and the like are used an scenario information. FIGS. 22 to 26 show format of scenario, information. FIG. 22 shows format of a scenario information file. FIG. 23(A) shows format of menu display type node information. FIG. 23(B) shows format of content display type node information. FIG. 24 shows format of menu information. FIG. 25 shows format of contents set information. FIG. 26 shows format of condition transitional information.

Figure 27:
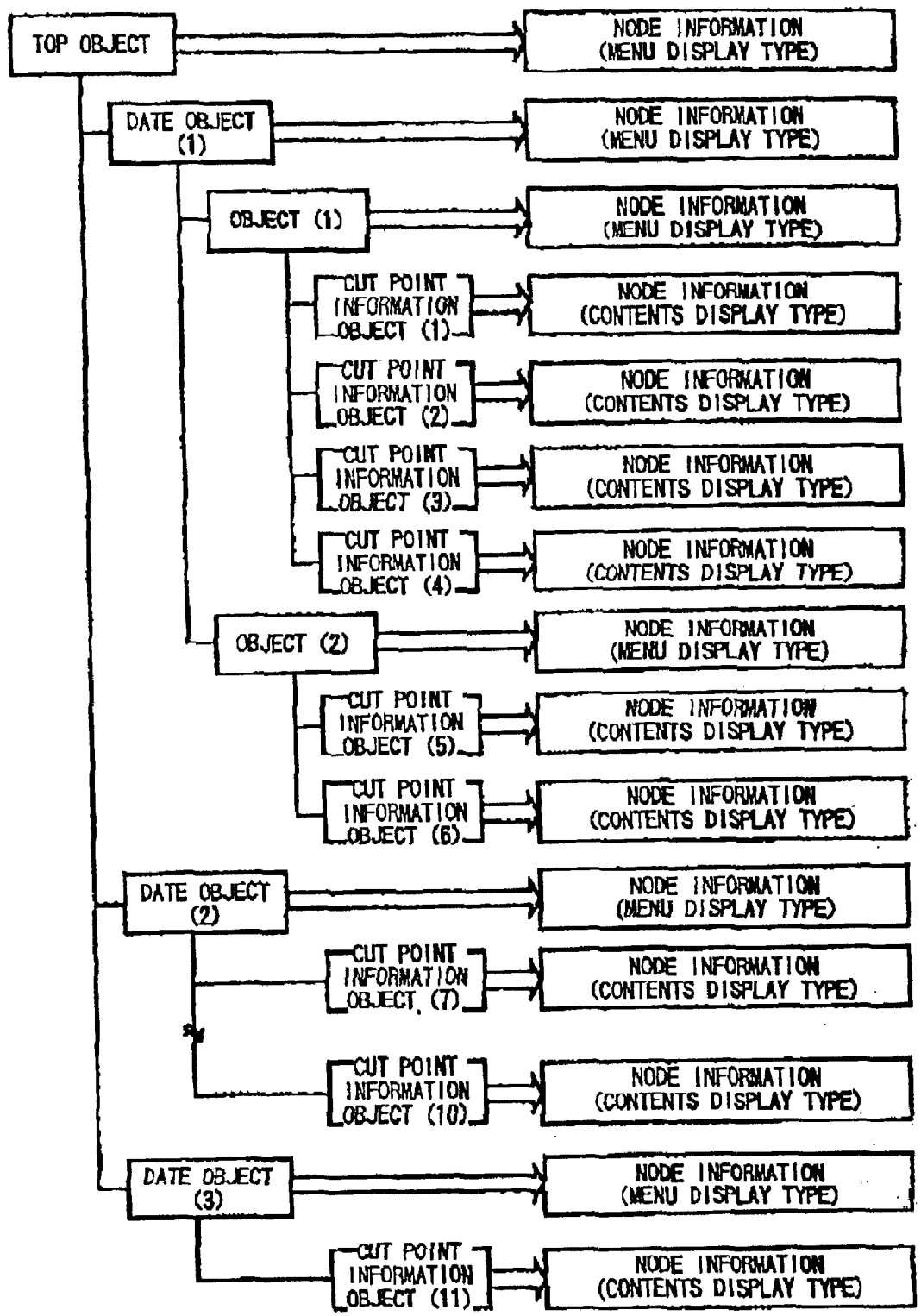
FIG. 27 is a schematic view showing the relationship between possessed objects and node information.

FIG. 27 shows relationship between possessed objects and node information of scenario information. Each object includes node information as shown in FIG. 27.

Figure 28:
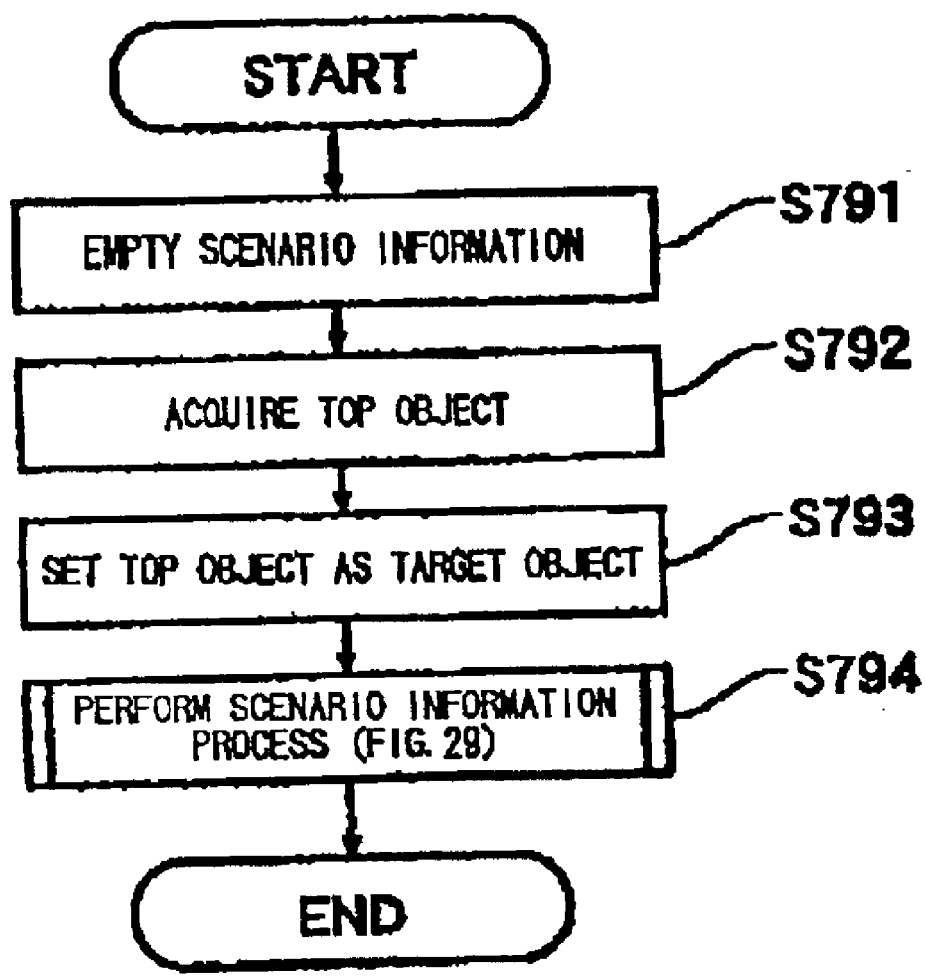
FIG. 28 is a flowchart representing processes for preparing scenario information from possessed objects.
Figure 29:
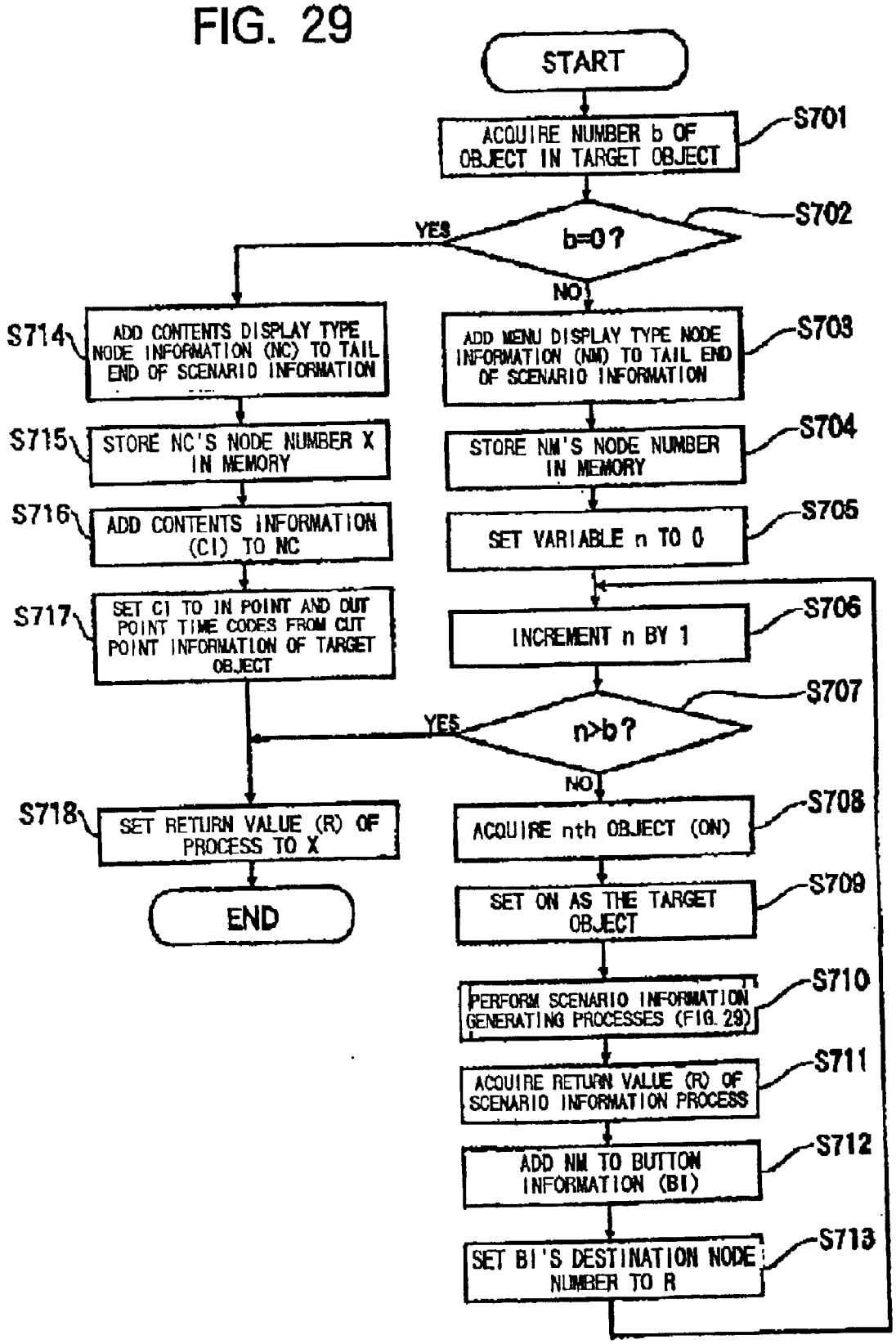
FIG. 29 is a flowchart representing processes for preparing scenario information from possessed objects.

Processes for generating scenario data from the possessed object will be explained while referring to the flowcharts shown in FIGS. 28 and 29. In FIG. 28, first in S791, the scenario information is emptied. In S792, the TOP object In retrieved. In S793, the TOP object is set as the target object. In S794, scenario information is generated in a manner represented by the flowchart in FIG. 29.

Processes for generating scenario information according to the flowchart in FIG. 29 will be explained in detail with reference to the example configurations shown in FIGS. 22 to 26. First in S701, the number of possessed objects b in the target object is acquired. In this example, the number of date objects in the TOP object, that is, three as shown in FIG. 27, is acquired. In S702, it is determined that the number of possessed objects, that is, three, does not equal zero. In S703, the menu display type node information (M1) is added to the scenario information. In S704, the node number (M1) of the node information is stored in a memory. In S705, a variable n is set to zero. In S706. the variable n is incremented by one. In S707, it is determined whether the variable n is greater than the number of possessed objects b. In this example, one (n−1) is compared with three (b=3), which results in a negative judgment in S707, whereupon the routine proceeds to S708. In S708, the date object (1) is acquired. In S709, the date object (1) is designated as the target object. In S710, the scenario information routine represented by the flowchart in FIG. 29 is recalled and again performed with respect to the new target object, that is, with respect to the date object (1).

In S701, the number of possessed objects in the date object (1), that is, two possessed objects, is acquired. In S702, it is judged that two does not equal zero. In S703, the menu display type node information (M2) is added to the tail end of the scenario information. In S704, the node number of the menu display type node information (M2) is stored in the memory. In S705, the variable n is set to zero. In S706, the variable n is incremented by one. In S707, it is judged that one is not greater than two. In S708, the object (1) is acquired. In S709, the object (1) is designated as a target object. In S710, the scenario information generating process represented by the flowchart in FIG. 29 are recalled and again performed with respect to the new target object.

In S701, the number of possessed objects in the object (1), that is, the four possessed objects, is acquired. In S702, it is judged that four is not equal to zero. In S703, the menu display type node information (M3) is added to the tail end of the scenario information. In S704, the node number of the menu display type node information (M3) is stored in the memory. In S105, the variable n is set to zero. In S706, the variable n is incremented by one. In S707, it is judged that one is not greater than four. In S708, the cut point information object (1) is acquired. In S709, the cut point information object (1) is designated as the target object. In S710, the processes represented by the flowchart in FIG. 29 are performed again.

In S701, the number of possessed objects in the cut point information object (1), that is, zero possessed objects, is acquired. In S702, it is judged that zero equals zero. As a result of this positive judgment, the routine proceeds to S704, whereupon the contents display type node information (C4) in added to the tail end of the scenario information. In S715, the node number of the contents display type node information (C4) is stored is the memory. In S716, the contents information is added to the contents display type node information (C4). In S717, the IN point and OUT point time codes for the cut point information of the target object, that is, for the first cut point information in this example, are designated as contents information of the contents display type node information (C4). In S719, the node number 4 of the contents display type node information (C4) is designated as a return value of the scenario information routine, and this routine is ended.

In S711, the return value 4 of the scenario information routine is acquired. In S712, the button information (B1) is added to the menu display type node information (M3). In S713, the return value 4, which was obtained in S711 from the node number at the contents display type node information (C4), is designated so the destination node number of the button information (B1). That is to say, when the button B1 is selected from the menu display type node information (M3), then the contents display type node information (C4) is indicated as the destination of the button B1.

In S706, n is incremented by one to two. In S707, it is judged that two is not greater than four. In S709, the cut point information object (2) is acquired. In S709, the cut point information object (2) is set as the target object. In S710, the processes represented by the flowchart in FIG. 29 are again performed on the new target object, that is, on the cut point information object (2).

In S701, the number of possessed objects in the cut point information object (2), that is, the number zero, is acquired. In S702, it is judged that zero equals zero. In S714, the contents display type node information (C5) is added to the end of the scenario information. In S715, the node number of the content display type node information (C5) is stored in the memory. In S716, the contents information is added to the contents display type node information (C5). In S717, the IN point and OUT point time codes for the cut point information object (2) is designated as the contents information for the contents display type node information (C5). In S718, the node number of the contents display type node information (C5) is designated as the return value 5 of the processes are ended.

In S711, the return value 5 of the scenario information routine is acquired. In S712, the button information (B1) is added to the display type node information (M3). In S713, the return value 5, which was obtained is S731 from the node number of the contents display type node information (C5), is designated as the destination node number of the button information (B2). That is, when the button B2 is selected in the menu display type node information (B3), then the contents display type node information (C5) is designated as the destination.

In S706, the variable n is incremented by one to three. In S707, it is judged that three is not greater than four. In S708, the cut point information object (3) is acquired. In S709, the cut point information object (3) is designated as the target object. In S115, the processes represented in the flowchart in FIG. 29 are again preformed on the new target object.

In S701, the number of possessed objects in the cut point information object (3), that is, the number zero, is acquired. In S702, it is judged that zero equals zero. In S714, the contents display type node information (C6) is added to the tail end of the scenario information. In S715, the node number of the contents display type node information (C6) is stored in the memory. In S716, the contents information is added to the contents display type node information (C6). In S717, the IN point and OUT point time codes of the cut point information object (3) is designated as the contents information for the contents display type node information (C6). In S618, the node number 6 of the contents display type node information (C6) is designated as the return value.

In S711, the return value 6 of the scenario information routine is acquired. In S712, the button information B3 is added to the menu type node information (M3). In S713, the node number of the contents display type node information (C6) obtained as the return value in S711 is designated as the destination node number of the button information (3). That is, when the button B3 is selected in the menu display type node information (M3), then the contents display type node information (C6) is indicated.

In S706, the variable n is incremented by one to four. In S707, it is judged that four is not greater than four. In 5706, the cut point information object (C4) is acquired. In S109, the cut point information object (C4) is designated as the target object. In S710, the processes indicate by the flowchart in FIG. 29 are again performed.

In S701, the number of possessed objects of the cut point information object (4), that is, the number zero, is acquired. In S702, it is judged that zero equals zero. In S714, the contents display type node information (C7) is added to the tail end of the scenario information. In S715, the node number of the contests display type node information (C7) is added to the memory. In S716, the contents information is added to the contents display type node information (C6). In S717, the IN point and OUT point time codes of the cut point information object (4) are designated as the contents information of the contents display type node information (C7). In S716, the node number 7 of the content display type node information (C7) is designated as the return value and these processes are ended.

In S711, the return value 7 of the scenario information processes is acquired. In S712, the button information (B4) is added to the menu type node information (M3). In S713, the return value 7, which was acquired in S711 from the node number of the contents display type node information (C7), is designated as the destination node number of the button information (B4).

In S706, the variable n is incremented by one to five. In S707, it is judged that five is greater than four. In S718, the node number 3 of the menu type node information (M3) is designated as the return value and these processes are ended.

In S711, the return value 3 of the scenario information processes in acquired. In S712, the button information (B5) is added to the menu display type node information (M2). In S713, the node number of the menu display type node information (M3) is designated as the destination node number of the button information (B5).

In S706, the variable n, which corresponds to the menu display type node information (M2), remains at the value of one, and so is incremented by one to two. In S707, it is judged that two is not greater than two. In S708, the object (2) is acquired. In S709, the object (2) is designated as the target object. In S710, the processes represented by the flowchart in FIG. 29 are again performed.

In S707, the number of possessed objects in the object (2), that is, the number two, is acquired. In S702, it is judged that two is not equal to zero. In S703, the menu display type node information (M8) is added to the tail end of the scenario information. In S704, the node number (M8) of the menu display type node information is stored in the memory. In S705, the variable n is set to zero. In S706, the variable n is incremented by one. In S706, it is judged that one is not greater than two. In S708, the cut point information object (5) is acquired. In S709, the cut point information object (5) is designated as the target object. In S710, the processes represented by the flowchart in FIG. 29 are again executed.

In S701, the number of possessed objects in the cut point information object (5), that is, the number zero, is acquired. In S702, it is judged that zero equals zero. In S711, the contents display type node information (C9) is added to the tail end of the scenario information. In S715, the node number of the contents display type node information (C9) is added to the memory. In S716, the contents information is added to the contents display type node information (9). In S717, the IN point and OUT point time codes of the cut point information object (5) is set as the contents information of the contents display type node information (C). In S718, the node number 9 of the content display type node information (C9) is designated as the return value. Then, these processes are ended.

In S711, the return value 9 of the scenario information processes are acquired. In S712, the button information (B6) is added to the menu display type node information (M8). In S713, the return value 9, which was obtained in S911 from the node number of the contents display type node information (M9), is set as the destination node number of the button information (B6).

In S706, the variable n is incremented by one to two. In S707, it is judged that two is not greater than two. In S708, the cut point information object (6) is acquired. In S709, the cut point information object (6) in designated as the target object. In S710, the processes represented by the flowchart in FIG. 29 are again performed.

In S701, the number of possessed objects in the cut point information object (6), that is, the number zero, is acquired. In S702, it is judged that zero equals zero. In S714, the contents display type node information (C10) is added to the tail end of the scenario information. In S715, the node number of the contents display type node information (C10) is stored in the memory. In S716, the contents information is added to the contents display type node information (CIO). In S717, the IN point and OUT point time codes at the cut point information object (6) is designated as the contents information of the contents display type node information (C10). In S718, the node number 10 of the contents display type node information (C10) is designated as the return value, and this routine is ended.

In S711, the return value 10 of the scenario information routine is acquired. In S712, the button information (B7) is added to the menu display type node information (M8). In S713, the return value 10, which was obtained in S711 from the node number of the contents display type node information (C10), is set as the destination node number of the button information (B7).

In S706, the variable n is incremented by one to three. In S707, it is judged that three is greater than two. In S708, the node number 8 of the menu display type node information (M8) is designated as the return value, and this routine is ended.

In S711, the return value 8 of the scenario information routine is acquired. In S712, the button information (B8) is added to the menu display type node information (M2). In S713, the node number of the menu display type node information (M8) is designated as the destination node number of the button information (B8).

In S706, the variable n is incremented by one to three. In S707, it is judged that three is greater than two. In S718, the node number 2 of the menu display type node information (M2) is designated as the return value of these processes, and this routine is ended.

In S711, the return value 2 of the scenario information routine is acquired. In S712, the button information (B9) is added to the menu display type node information (M1). In S713, the node number of the menu display type node information (M2) is designated as the destination node number of the button information (B9).

The above description is with respect to the data object (1) of the TOP object. That is, the processes are performed in this manner because the variable n is set to one. However, in the subsequence processes, the variable n will be set to two. So that processes will be started for the date object (2). Although the date object (2) includes only two possessed objects, the processes will be performed in substantially the same manner as described for the date object (1). These processes will be also performed in the same manner with respect to the date object (3). Once processes have been completed for all objects of the TOP object, the object configuration with node information represented by FIG. 27 will have been prepared.

Figure 30:
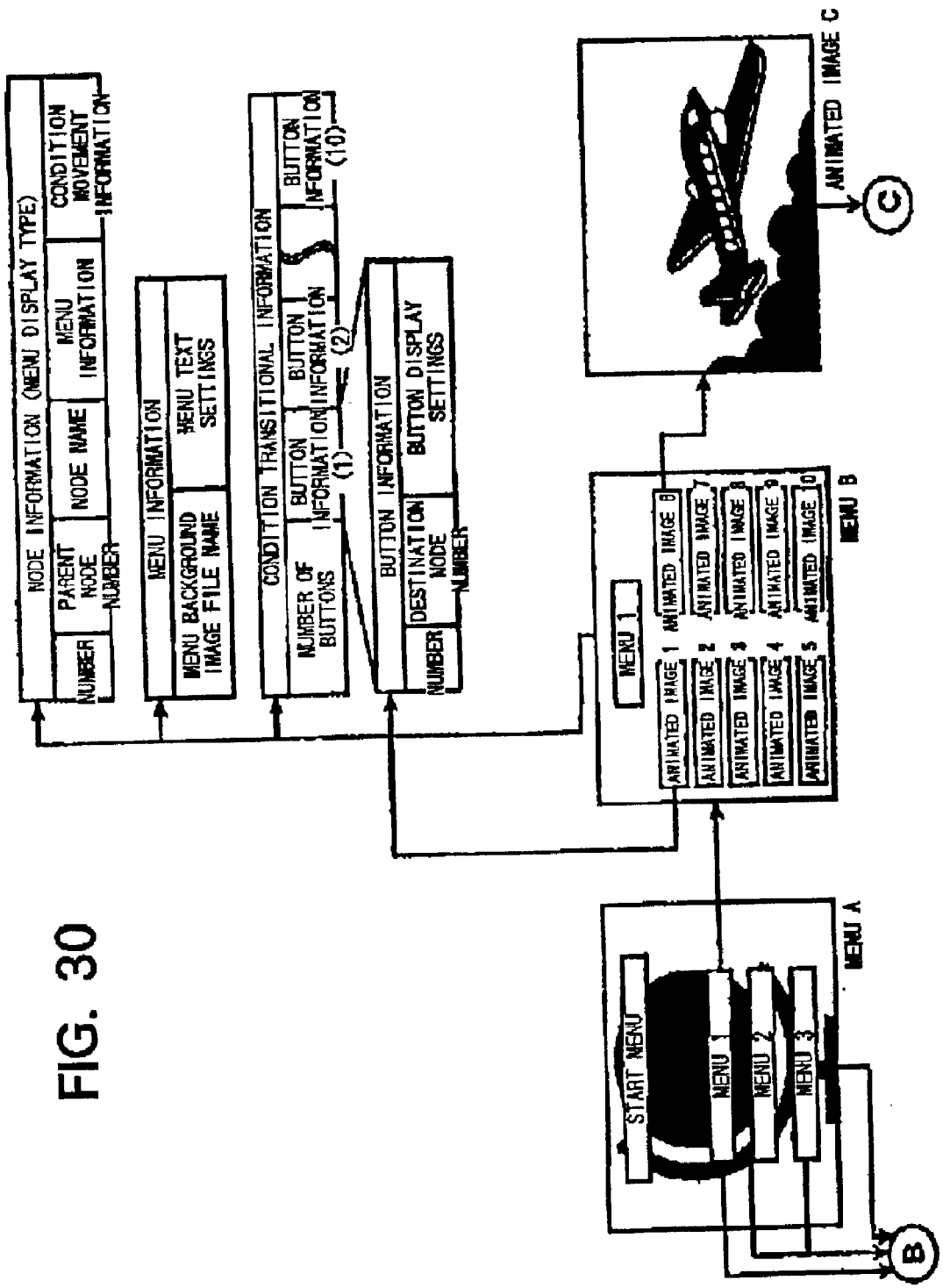
FIG. 30 is a schematic view representing what happens when a sub menu is selected from a parent menu and a desired image is displayed.
Figure 31:
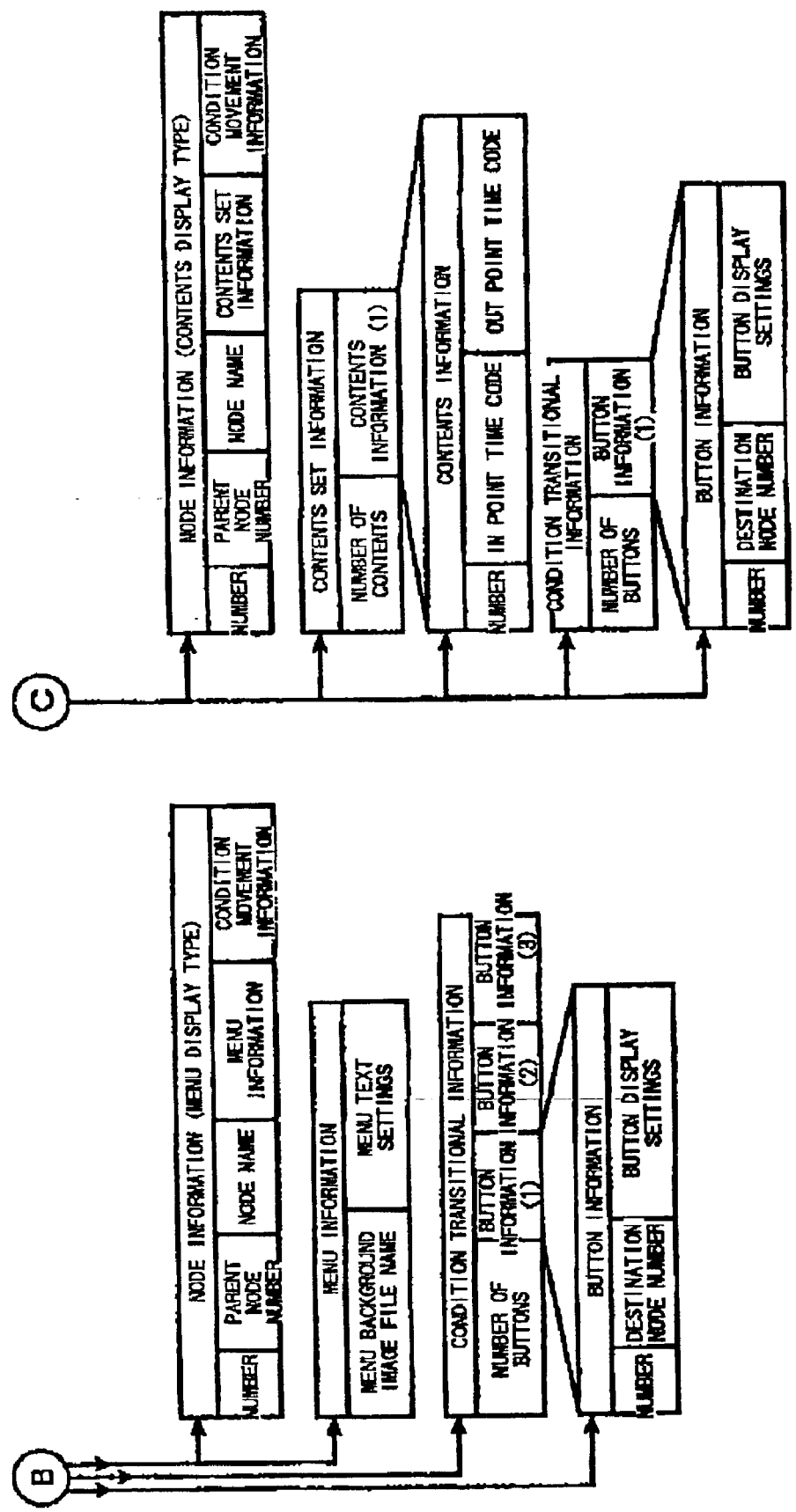
FIG. 31 is a schematic view representing what happens when a sub menu is selected from a parent menu and a desired image is displayed.

FIGS. 30 and 31 schematically represent what happens when a sub menu is selected from a parent menu and a desired image is displayed. First, a parent menu A is displayed. When menu 1 is selected from the parent menu A, then the sub menu B is displayed. When animated image 6 is selected from the sub menu B, the desired image C is displayed. Each menu is configured, from the scenario information based on the configuration prepared using the above-described processes.

Scenario information prepared in the RAM 103 of the personal computer in the above-described manner is stored on the hard disk drive 104 as a file using scenario information output processes of the automatic scenario generating device. DVD images can be prepared by inputting trio scenario information file into a scenario information input unit 201 of the authoring device B shown in FIG. 1. As shown in FIG. 1, the authoring device B includes the scenario information input unit 201, a video data input unit 202, as audio data input device 203, a playback control information generating unit 204, a video data encoding unit 205, an audio data encoding unit 206, a control unit 207, a multiplexing unit 207, a disk management information storage unit 209, a system stream management information storage unit 210, a system stream storage unit 211, and an output unit 212.

Next, a second embodiment of the present invention will be described. Next, preparation of selection menus divided into menus by recording date and recording time, and scenario information configuring index menus, according to the present embodiment will be described. The index menu is the menu that includes digest images only of image contents, which are the main information sets provided using the direct selection menus. The digest images are groups of two second images for the start middle n points of image contents provided using the direct selection menu. The index information can be configured from cut point information.

Figure 32:
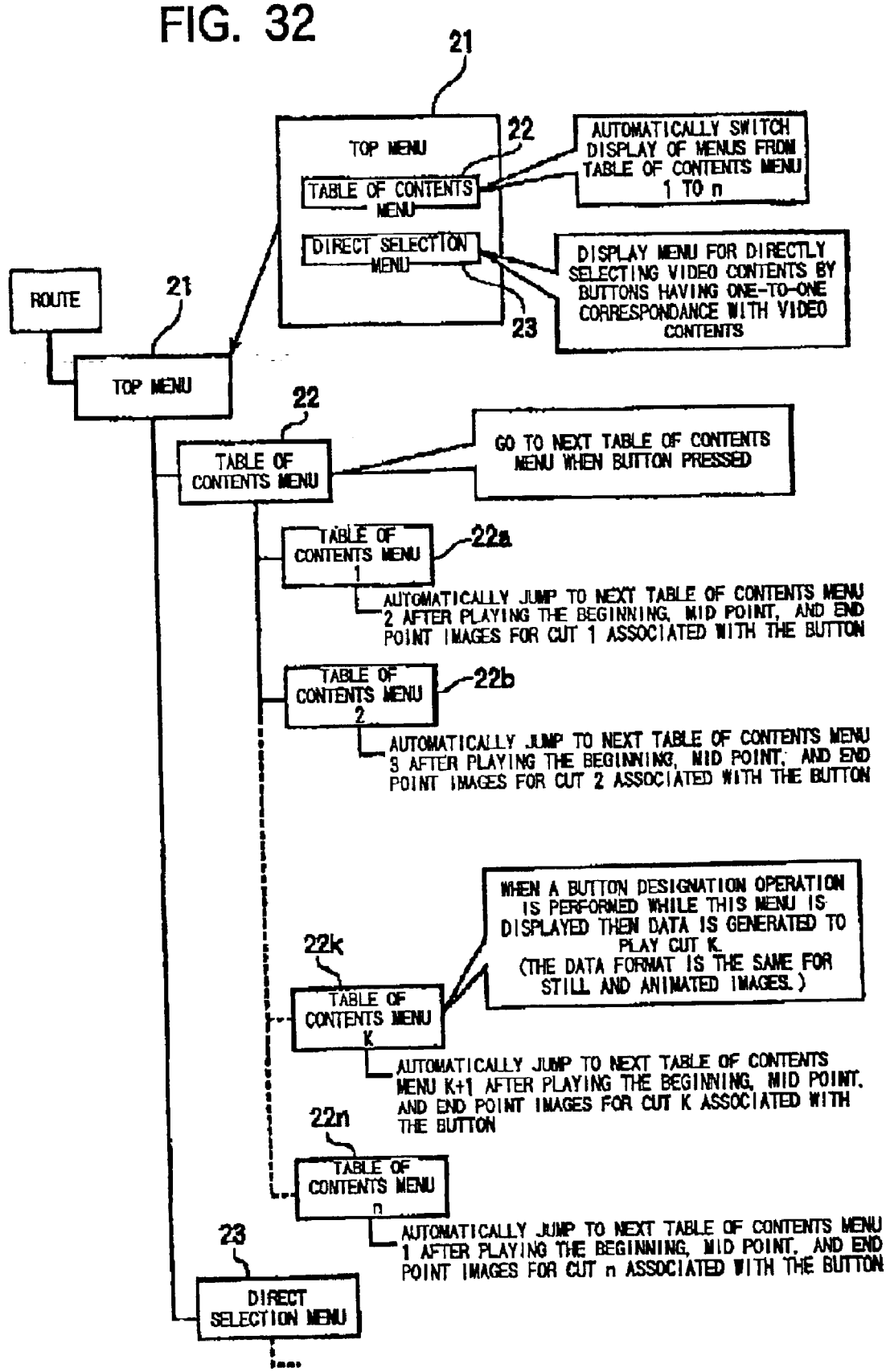
FIG. 32 is a schematic view representing interrelationship of different menus according to a second embodiment of the present invention.

FIG. 32 is a schematic view representing the interrelationship of different means. As shown, the top menu 21 includes an index menu 22 and a direct selection menu 23. The index menu 22 further includes index menus 1 to n.

On the display screen, the top menu 21a is displayed with an index menu 22a and a direct selection menu 23a. The index mesa 22a automatically switches between the display of the different index menus 1 to n. The direct selection menu 23a displays buttons with one to one correspondence with certain video contents. The video contents can be displayed by directly selecting the video contents using the direct selection menu 23a.

When the index menu 22 is selected by being pressed or clicked, then display changes to the index menu 22a. The beginning point, mid point and end point associated with the index menu 22a are reproduced, and then image automatically jumps to the next index menu 22b. In this way, all the index menus in association with images are reproduced one after the other automatically, while the index menu is being displayed, the corresponding cuts can be reproduced by operating a predetermined button.

Figure 33:
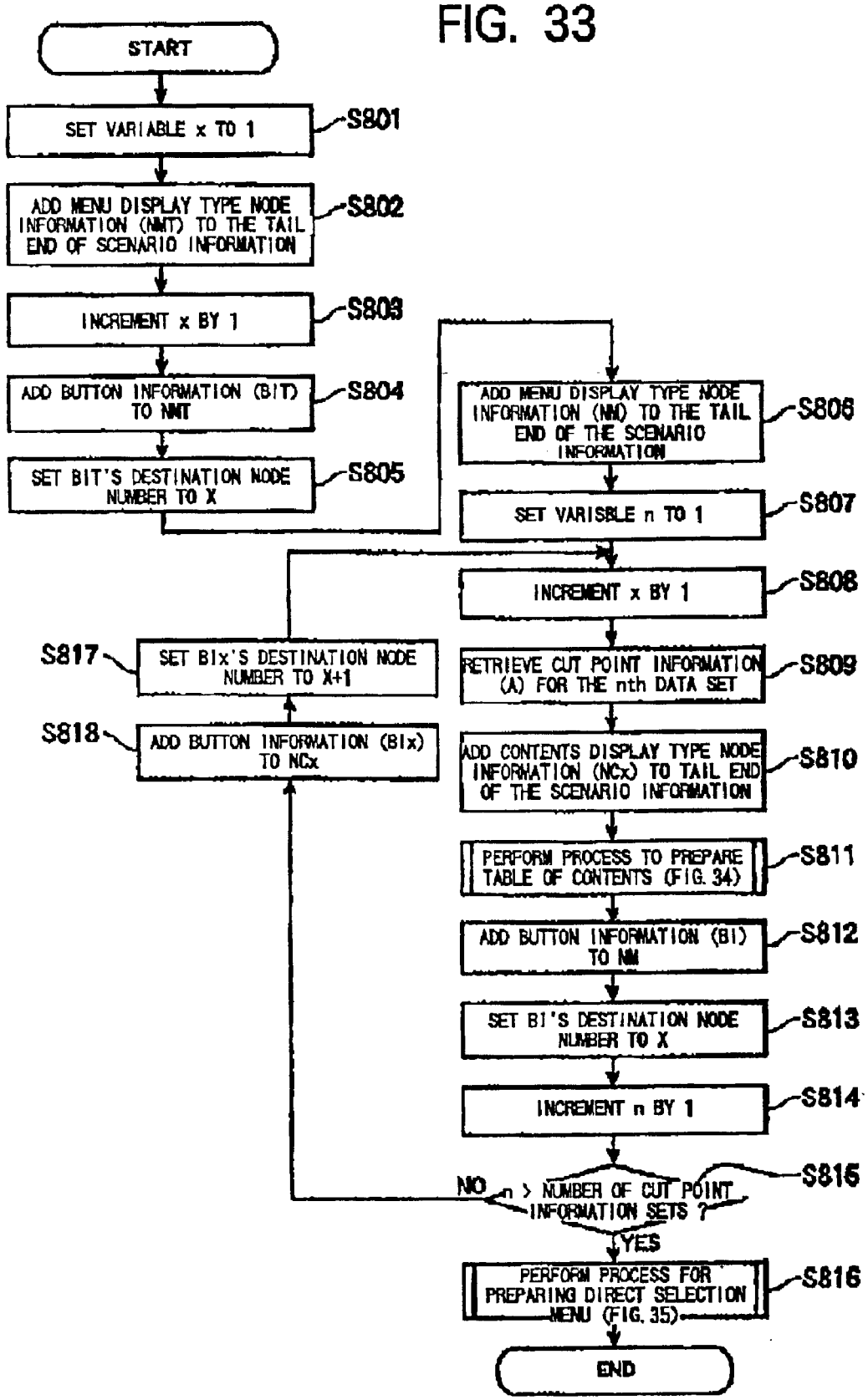
FIG. 33 is a flowchart representing processes for generating scenario data for displaying an index menu.

Next, operations for preparing scenario information configured from menus in this manner will be described. FIG. 33 is a flowchart representing processes for generating scenario data for displaying an index menu. First, in S801, the variable x is set to one. In S802, menu display type node information NMT is added to the tail end of the scenario information. In S803, x is incremented by one. In S804, button information BIT is added to the menu display type node information NNT. In S803, the destination node number for the button information BIT is set. Then in S806, menu display type node information NN is added to the tail end of the scenario information. As a result of these processes, the top menu is configured.

Figure 34:
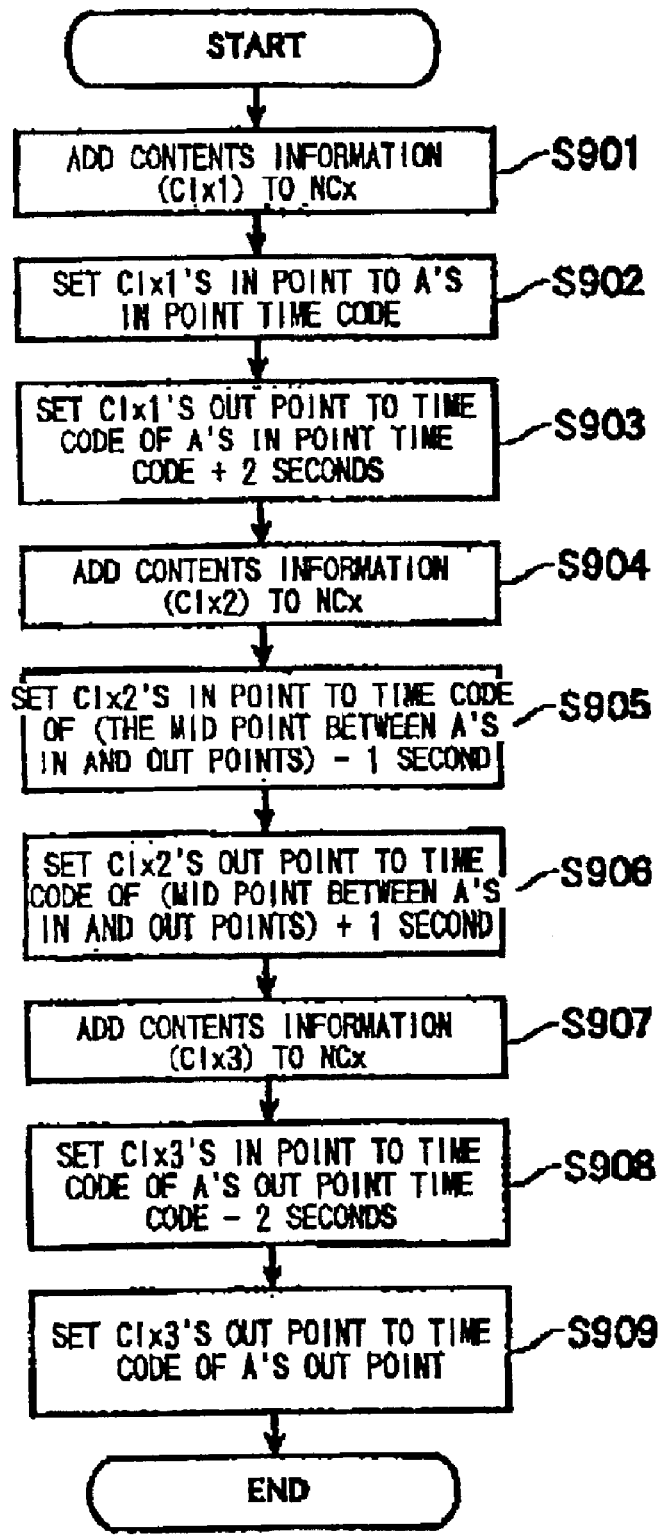
FIG. 34 is a flowchart representing processes for preparing index contents.

In S807, a variable n is set to one. In S808, the variable x is incremented by one. In S809, cut point information N associated with the nth data number is retrieved. In S810, contents display type node information NCX is added to the tail end of the scenario information. In S811, index contents processes represented by the flowchart in FIG. 34 are performed. In S812, the button information BI is added to the menu display type node information NM. In S813, the value of variable x is set as the destination node number of the button information BI. In S814, the variable n is incremented by one. In S815, it is judged whether the variable n is greater than the cut point information number. If not (S815:NO), then in S818, the button information BIX is added to the content display type node information NCX. Then, in S817, x+1 is set as the destination node number of the button information BIX. Then, x is again incremented by one in S808. These processes are repeated until the variable a exceeds the cut point information number (S815:YES). By repeating these processes, the index menus are prepared. Once the variable n exceeds the cut point information number (S815:YES), then the routine performs the direct selection menu preparation processes presented by the flowchart of FIG. 35, and this routine in ended.

FIG. 34 is the flowchart representing processes, for preparing index contents. First, in S901, contents information $CI^x1$ is added to the contents display type node information NCX. In S902, the IN point time code of the cut point information A is set as the IN point contents information $CI^x1$. In S903, the type node indicating the time two seconds after the IN point time code of the cut point information A is set to the OUT point of the contents information $CI^x2$. Depending on particular circumstances, this two second time duration can be extended or shortened as needed. In S904, the contents information $CI^x2$ is added to the contents display type node information NCX. In S905, the time code indicating one second after the mid point between IN and OUT points A is set as the IN point of the contents information $CIX^x2$. In S906, the time node indicating one second after the mid point between the IN and OUT points of the cut point formation A is set as the OUT point of the contents information $CI^x2$. It S907, contents information $CI^x3$ is added to the contexts display type node information NCX. In S908, the time code indicating two seconds before the OUT point time node of the content A is set as the IN point of the contents information Cix3, in S909, the OUT point time node of the cut paint information A is sat as the OUT point of the contents information Cix1. Then, this routine is ended.

Figure 35:
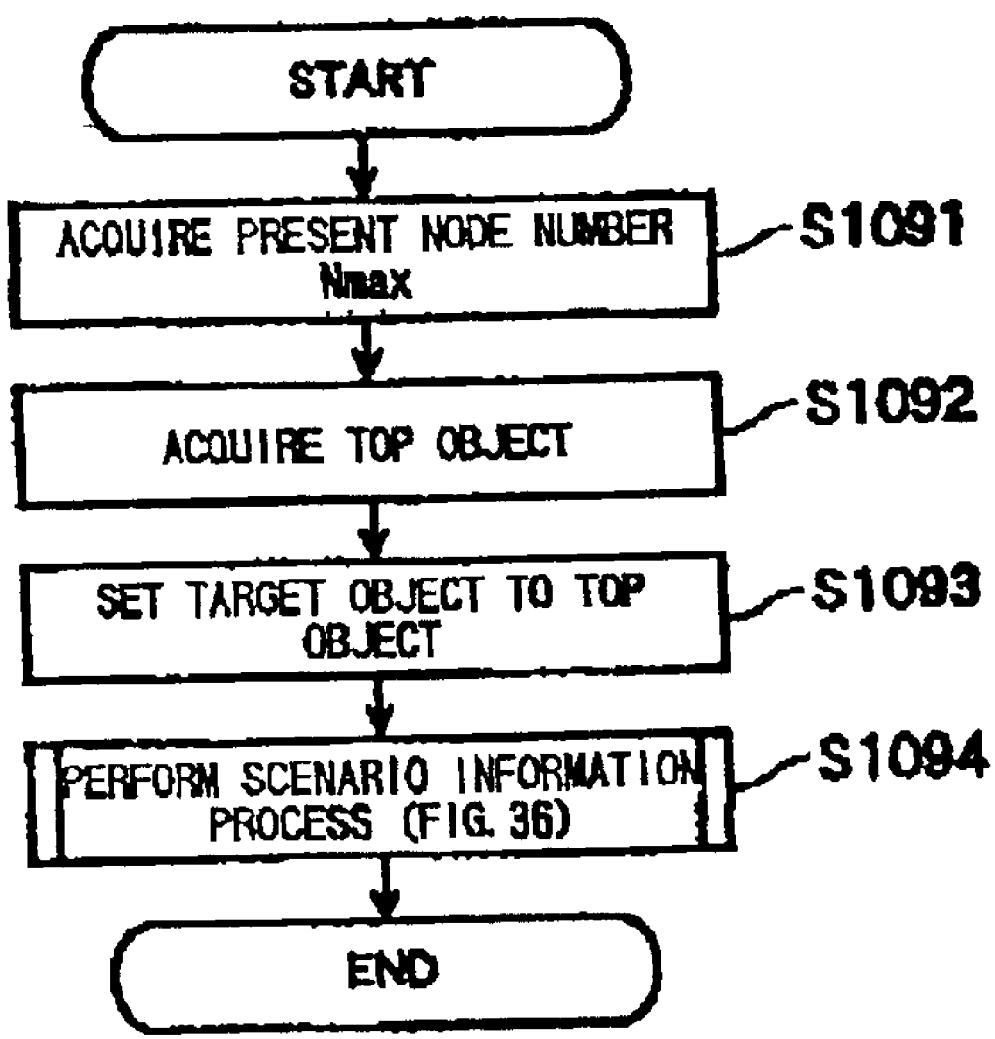
FIG. 35 shows a flowchart representing processes for producing scenario information for direct selection menu configuration.

FIG. 35 shows a flowchart representing processes for producing scenario information for the direct selection menu configuration. In summary, in S1091, the present node number Nmax is acquired. In S1093, the TOP object is acquired. In S1093, the target object is set to the TOP object. In S1094, a scenario information routine represented by the flowchart in FIG. 36 is performed.

Figure 36:
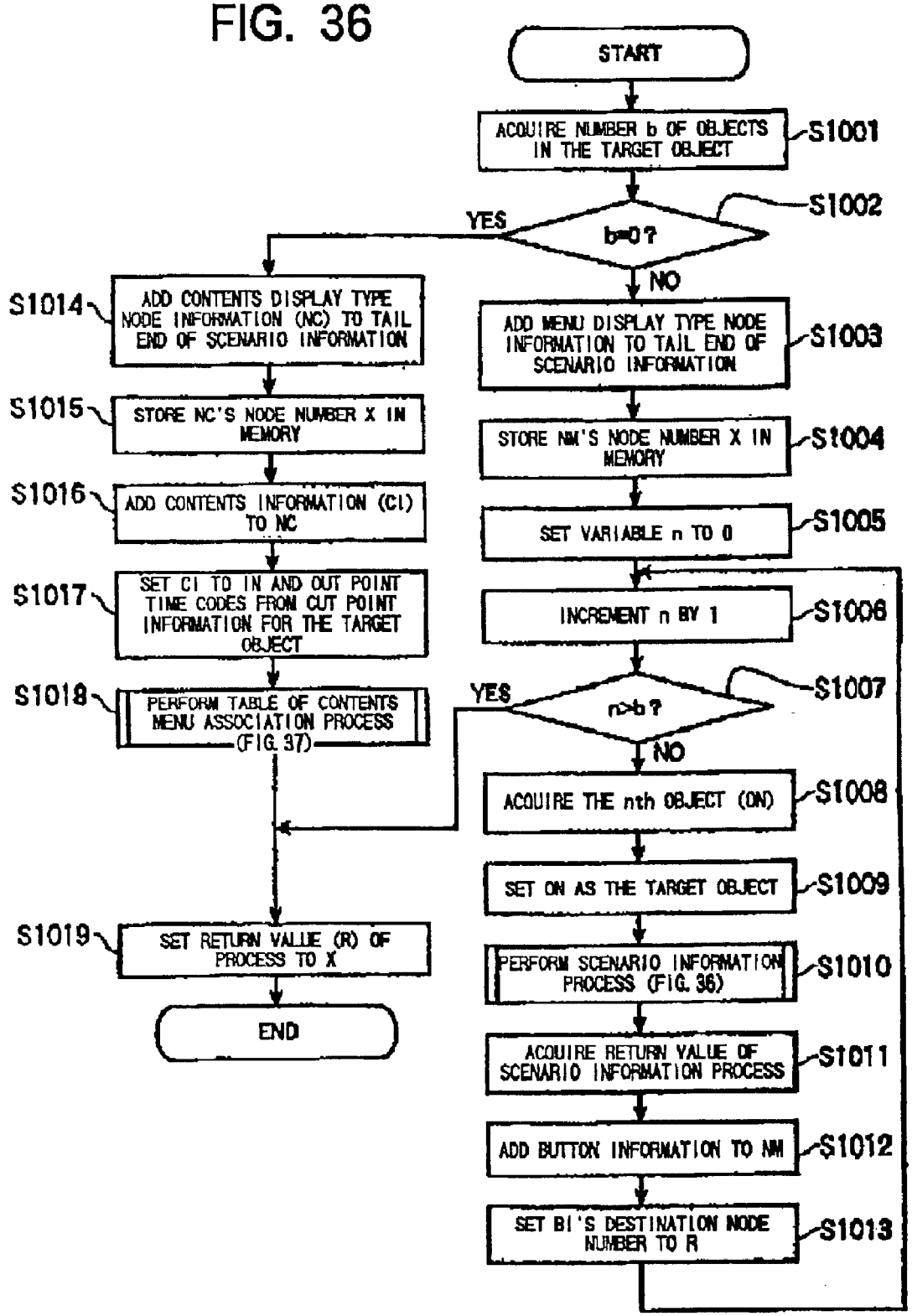
FIG. 36 is a flowchart representing processes according to a third embodiment for preparing scenario information from possessed objects.

FIG. 36 is a flowchart representing operation according to a third embodiment for preparing scenario information from possessed objects. In FIG. 36, the processes represented by FIG. 36 are substantially the same as those represented by the flowchart in FIG. 29. That is, first, a TOP object is retrieved from the scenario information and the TOP object is set as the target object. Then, scenario information is prepared. The processes represented by the flowcharts in FIG. 36 differ from those represented by the flowchart in FIG. 29, only with respect to processes for establishing the relationship in the menus. The processes for establishing relationship of index menus will be described while referring to FIG. 37.

Figure 37:
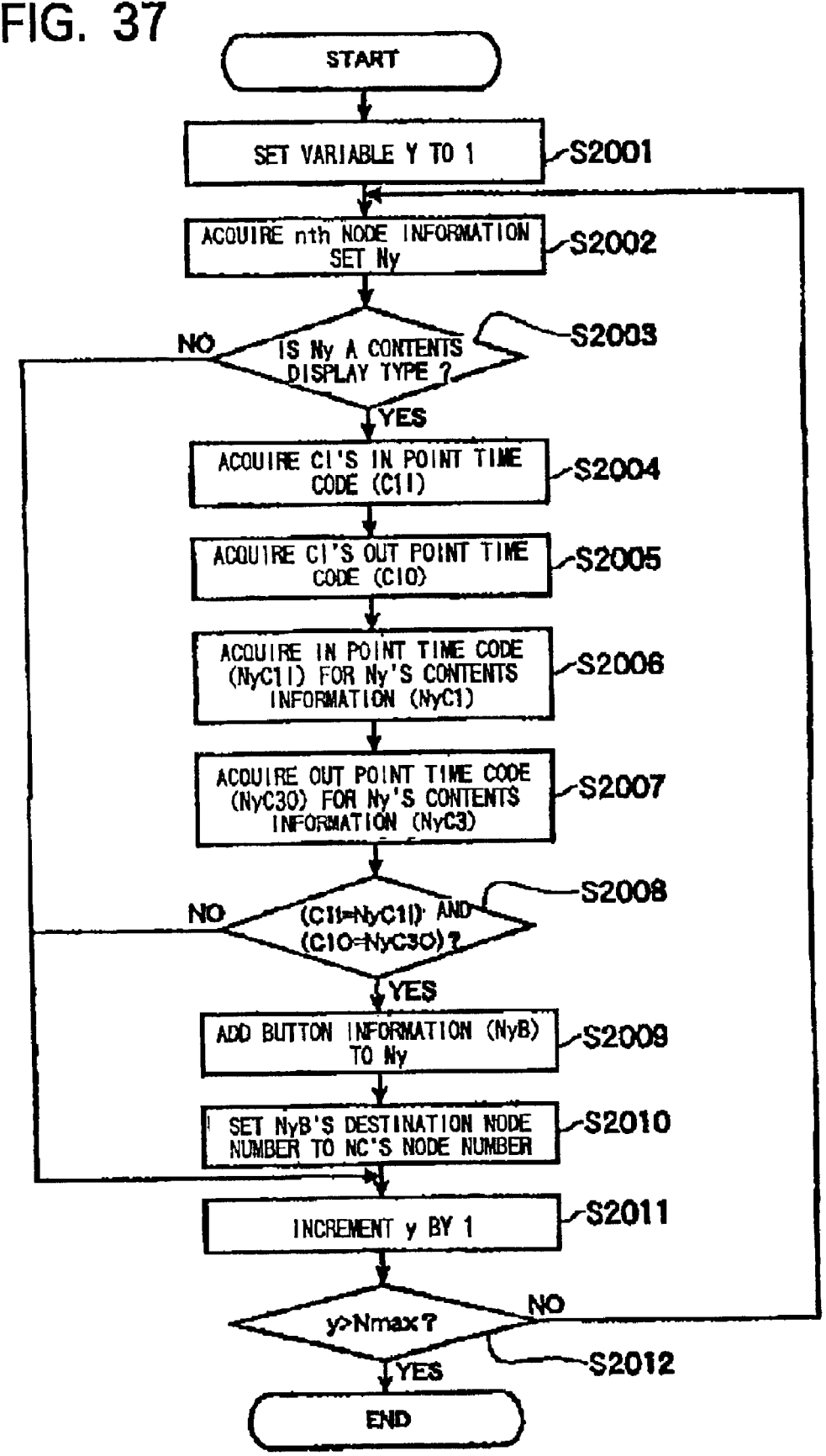
FIG. 37 is a flowchart representing processes for establishing the relationship of index menus according to the third embodiment.

In S2001 of the flowchart in FIG. 37, the variable y is set to one. In S2002, node information ny corresponding to the node number y is retrieved. In S2003, it is judged whether or not the node information Nl is contests display type node information. If so (S2003:YES), then in S2004, the IN point time code ClI of the contents information is retrieved. In S2005, the OUT point time code CIO of the contents information is retrieved. In S2006, the IN point time code (NyClI) of the contents information (NyCl) of the node information (Ny) is retrieved. In S2007, the OUT point time code (NyC30) of the contents information 3 (NyC3) of the node information (Ny) is retrieved.

In S2008, it is judged whether the IN point time code ClI of the contents information is equal to the IN point time coda (NyClI) of the contents information 1 (NyC1). It is also judged whether the OUT point time node CIO of the contents information is equal to the OUT point time code (NyC30) of the contents information 3 (NyC3). If both of these conditions are met (S2008:YES), then in S2004, button information NyB is added to the node information (Ny). In S2010, the node number of the contents display type node information is set as the destination node number for the button information NyB. In S2011, the variable y is incremented by one. In S2012, it is judged whether or not the variable y is greater than the value Nmax. If not (S2012:NO), then in S2002, node information Ny+1 associated with the node number y+1 is retrieved. Then, the above-described processes are repeated again. The processes are also repeated in the same manner if either S2003 or S2006 results in a negative judgment. Once S3012 results in a positive judgment, then this process is ended.

Although the embodiment describes the maximum number of buttons Bmax, as being set by the maximum number set in the single menu unit, the maximum number of buttons Bmax could be a value prestored in the memory medium, such as the RAM 103 or ROM 104. In this case, it is desirable that the number be set to about ten to make selection easy for the user.

The scenario information generated in the RAM 103 of the personal computer in the above-described manner is stored in the hard disk drive 104 as a file by the automatic scenario generating device A of FIG. 1. DVD images can be prepared by inputting such a scenario information file into the scenario information input unit of the authoring device B of FIG. 1. Also, the scenario information file can be stored in a memory medium, such as CD ROM and retrieved by the computer.

The present invention is not limited to DVD, but could be applied to a variety of different types of multimedia optical disks. The embodiments describe using data configurations termed objects as the data configuration used when editing cut point information and preparing scenario information from the edited objects. However, the present invention is not limited to the data configuration termed objects. Other data configurations can be used with the same effects. For example, folders, such as those used in Windows $95^{RT}$, can be used.

Also, in the embodiments recording data is used as cut point information, and a cut point information table is used by grouping the cut point information by recording date, and scenario information is prepared accordingly. However, by using the global positioning system (GPS), location information, such an longitude and latitude, can be recorded with images. In this case, when the cut point information table is prepared, the location information can be used to divide the cut point information into groups. For example, cut point information associated with the location information (longitude and latitude) areas in the center part of Japan can be grouped in one group and cut point information associated with position information of areas in the east part of Japan can be separated from another group. In this way, information need not be grouped in by recording date, but could be instead be grouped according to any type of information that can be recorded with images and later extracted.

According to the embodiments, the cut point information table was prepared. However, the cut point information table can be input directly into the cut point information table editing unit 35 in the form of a cut point information file prestored on the hard disk drive 104.

In the embodiments, the maximum number of buttons that can fit in a single menu is determined based on the menu screen size and button size. However, this is not a limitation of the present invention. For example, a button size can be determined based on the font size of the button name displayed on the button and on the button name itself. The maximum number of buttons that can fit in the menu can then be determined based on this determined button size and the menu screen size. Alternatively, the range of where buttons are in the menu screen end the button size can be designated by the user, and the maximum number of buttons that can fit within that range can be determined.

What is claimed is:

1. A recorded information processing device comprising:
a non-consecutive position information detecting unit that detects non-consecutive position information representative of each of a plurality of blocks of recorded information recorded in time sequence in a recording medium, identification information being attached to each of the plurality of blocks of recorded information;
a recorded information dividing unit that divides, based on the non-consecutive position information, the plurality of blocks of recorded information into a plurality of groups, a number of the plurality of groups not exceeding a predetermined maximum, a number of blocks of recorded information contained in each of the plurality of groups not exceeding the predetermined maximums; and
a display unit that displays first indicias corresponding respectively to the plurality of groups on a display screen, each of the first indicias being in association with the identification information of one or more blocks of recorded information contained in a corresponding group.

2. The recorded information processing device according to claim 1, wherein said display unit further displays second indicias corresponding to the one or more blocks of recorded information contained in the corresponding group, each of the second indicias being in association with the identification information of the one or more blocks of recorded information contained in the corresponding group.

3. The recorded information processing device according to claim 2, wherein the first indicias form a first level menu and the second indicias form a second level menu, the first level menu and the second level menu being in a hierarchy data structure in which the second level menu is linked with a corresponding one of the first indicias.

4. The recorded information processing device according to claim 3, wherein the first indicias displayed on the display screen serve as buttons for displaying the plurality of groups, and the second indicias displayed on the display screen serve as buttons for reproducing the blocks of recorded information contained in a group indicated by a corresponding first indicia, and wherein the predetermined maximum is determined based on a size of the buttons and a size of the display screen.

5. The recorded information processing device according to claim 1, further comprising a number setting unit that sets the number that said recorded information dividing unit divides the plurality of blocks of recorded information.

6. The recorded information processing device according to claim 1, wherein information extracted from the non-consecutive position information is used as the identification information of a corresponding block of recorded information.

7. The recorded information processing device according to claim 1, wherein the identification information of the one or more blocks of recorded information contained in each of the groups is made up of common information and unique information, the common information being used as the first indicia.

8. The recorded information processing device according to claim 7, wherein the identification information is represented by time at which corresponding block of recorded information is recorded.

9. The recorded information processing device according to claim 1, wherein each of the plurality of blocks of recorded information includes a stream of images.

10. A scenario information generating device comprising:
an input unit that allows a user to input scenario preparation conditions, the scenario preparation conditions including cut point information preparation parameters, and cut point information table editing parameters;
a cut point information preparation unit that prepares a cut point information table containing a plurality of pieces of cut point information, each of the plurality of pieces of cut point information representing a length of a block of recorded information, the length being defined by a start time point and an end time point of the block of recorded information, the plurality of pieces of cut point information being detected from a plurality of blocks of recorded information in accordance with the cut point information preparation parameters, the plurality of blocks of recorded information being recorded in time sequence on a recording medium;
an editing unit that edits the cut point information table so that the plurality of blocks of recorded information are divided into a plurality of groups based on the plurality of pieces of cut point information, a number of the plurality of groups not exceeding a predetermined maximum, a number of blocks of recorded information contained in each of the plurality of groups not exceeding the predetermined maximum, said editing unit outputting cut point information table editing data; and
a generating unit that generates scenario information of the plurality of recorded information based on the cut point information table editing data.

11. The scenario information generating device according to claim 10, further comprising a display unit that displays, based on the scenario information, a first menu page containing first indicias corresponding to the plurality of groups and a second menu page containing second indicias corresponding to one or more blocks of recorded information contained is a corresponding group.

12. The scenario information generating device according to claim 10, wherein the plurality of blocks of recorded information are retrieved from a video time.

13. The scenario information generating device according to claim 10, wherein the cut point information is represented by time data.

14. The scenario information generating device according to claim 10, wherein said editing unit synthesizes at least two pieces of cut point information adjacent in time to each other to provide a new piece of cut point information in accordance with the cut point information table editing parameters to provide a modified cut point information table, and said editing unit edits the modified cut point information table instead of the cut point information table.

15. A storage medium storing a recorded information processing program, the recorded information processing program comprising:
a program for detecting non-consecutive position information representative of each of a plurality of blocks of recorded information recorded in time sequence in a recording medium, identification information being attached to each of the plurality of blocks of recorded information;

a program for dividing, based on the non-consecutive position information, the plurality of blocks of recorded information into a plurality of groups in such a manner that a number of the plurality of groups does not exceed a predetermined maximum and also a number of blocks of recorded information contained in each of the plurality of groups does not exceed the predetermined maximum;

a program for displaying first indicias corresponding respectively to the plurality of groups on a display screen; and a program for making each of the first indicias associate with the identification information of one or more blocks of recorded information contained in a corresponding group.

16. The storage medium according to claim 15, further comprising a program for further displaying second indicias corresponding to the one or more blocks of recorded information contained in the corresponding group; and a program for making each of the second indicias associate with the identification information of the one or more blocks of recorded information contained in the corresponding group.

17. The storage medium according to claim 16, further comprising a program for displaying the first indicias as a first level menu and the second indicias as a second level menu; a program for making the first level menu and the second level menu in a hierarchy data structure; and a program for making the second level menu link with a corresponding one of the first indicias.

18. The storage medium according to claim 17, further comprising a program for setting the first indicias as mimical buttons operable on the display screen, and setting the second indicias as mimical buttons operable on the display screen for reproducing the blocks of recorded information contained in a group indicated by a corresponding first indicia; and a program for determining the predetermined maximum based on a size of the mimical buttons and a size of the display screen.

19. The storage medium according to claim 15, further comprising a program for setting the number that the plurality of blocks of recorded information are divided.

20. The storage medium according to claim 15, further comprising a program for determining the identification information of a block of recorded information based on information extracted from corresponding non-consecutive position information.

21. The storage medium according to claim 15, wherein the identification information of the one or more blocks of recorded information contained in each of the groups is made up of common information and unique information, the common information being used as the first indicia.

22. The storage mediums according to claim 21, wherein the identification information is represented by time at which corresponding block of recorded information is recorded.

23. The storage medium according to claim 15, wherein each of the plurality of blocks of recorded information includes a stream of images.

24. A storage medium containing a scenario information generating program, the scenario information generating program comprising:

a program for allowing a user to input scenario preparation conditions, the scenario preparation conditions including cut point information preparation parameters and cut point information table editing parameters;

a program for preparing a cut point information table containing a plurality of pieces of cut point information, each of the plurality of pieces of cut point information representing a length of a block of recorded information, the length being defined by a start time point and an end time point of the block of recorded information;

a program for detecting the plurality of pieces of cut point information from a plurality of blocks of recorded information in accordance with the cut point information preparation parameters while reproducing the plurality of blocks of recorded information recorded in time sequence on a recording medium;

a program for editing the cut point information table so that the plurality of blocks of recorded information are divided into a plurality of groups based on the plurality of pieces of cut point information;

a program for determining a number of the plurality of groups and a number of blocks of recorded information contained in each of the plurality of groups so as not to exceed a predetermined maximum, and for outputting cut point information table editing data; and a program for generating scenario information of the plurality of recorded information based on the cut point information table editing data.

25. The storage medium according to claim 24, further comprising a program for displaying, based on the scenario information, a first menu page containing first indicias corresponding to the plurality of groups and a second menu page containing second indicias corresponding to one or more blocks of recorded information contained in a corresponding group.

26. The storage medium according to claim 24, wherein the plurality of blocks of recorded information are retrieved from a video tape.

27. The storage medium according to claim 24, wherein the cut point information is represented by time data.

28. The storage medium according to claim 24, further comprising a program for synthesizing at least two pieces of cut point information adjacent in time to each other to provide a new piece of cut point information in accordance with the cut point information table editing parameters to provide a modified cat point information table; and a program for editing the modified cut point information table instead of the cut point information table.

* * * * *